(12) United States Patent
Menachem

(10) Patent No.: US 11,688,365 B2
(45) Date of Patent: Jun. 27, 2023

(54) SYNCHRONOUS DISPLAY PIPELINE SYSTEMS AND METHODS

(71) Applicant: Apple Inc., Cupertino, CA (US)

(72) Inventor: Assaf Menachem, Hod Hasharon (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/466,865

(22) Filed: Sep. 3, 2021

(65) Prior Publication Data

US 2022/0343878 A1 Oct. 27, 2022

Related U.S. Application Data

(60) Provisional application No. 63/179,961, filed on Apr. 26, 2021.

(51) Int. Cl.
| | |
|---|---|
| *G09G 5/12* | (2006.01) |
| *G09G 5/14* | (2006.01) |
| *G09G 5/377* | (2006.01) |
| *G06T 1/20* | (2006.01) |

(52) U.S. Cl.
CPC .............. *G09G 5/14* (2013.01); *G06T 1/20* (2013.01); *G09G 5/12* (2013.01); *G09G 5/377* (2013.01); *G09G 2300/026* (2013.01); *G09G 2320/08* (2013.01); *G09G 2340/10* (2013.01); *G09G 2370/20* (2013.01)

(58) Field of Classification Search
CPC . G06T 1/20; G09G 5/14; G09G 5/377; G09G 2340/12; G09G 2300/02; G09G 2320/06; G09G 2320/08; G09G 2340/10; G09G 5/026; G09G 2370/20; G09G 2370/08
See application file for complete search history.

(56) References Cited

U.S. PATENT DOCUMENTS

| | | | |
|---|---|---|---|
| 10,373,282 | B2 | 8/2019 | Amar |
| 2015/0371607 | A1 | 12/2015 | Holland et al. |
| 2019/0080656 | A1 | 3/2019 | Herranz et al. |
| 2019/0295210 | A1 | 9/2019 | Pei et al. |
| 2020/0014904 | A1 | 1/2020 | Wetzstein et al. |
| 2020/0143516 | A1* | 5/2020 | Martin ................. G06T 3/4092 |

OTHER PUBLICATIONS

International Search Report and Written Opinion for PCT Application No. PCT/US2022/024886 dated Aug. 5, 2022; 9 pgs.

* cited by examiner

*Primary Examiner* — Hau H Nguyen
(74) *Attorney, Agent, or Firm* — Fletcher Yoder, P.C.

(57) ABSTRACT

An electronic device may include a first display pipeline that may output image data via an output path. The electronic device may include first frame merge circuitry coupled to the output path. The electronic device may also include a first multiplexer coupled to the first frame merge circuitry and to the output path. The first multiplexer may transmit the image data from the output path to an electronic display, and, in response to a first control signal associated with the first frame merge circuitry generating a merged output, the first multiplexer transmits the merged output to the electronic display.

20 Claims, 14 Drawing Sheets

SYNCHRONOUS DISPLAY PIPELINE SYSTEMS AND METHODS

CROSS REFERENCE TO RELATED APPLICATIONS

This application claims priority from and the benefit of U.S. Provisional Application No. 63/179,961, entitled "Synchronous Display Pipeline Systems and Methods", filed Apr. 26, 2021, which is hereby incorporated by reference in its entirety for all purposes.

BACKGROUND

The present disclosure relates generally to image processing and, more particularly, to efficiently processing image data for display on an electronic display characterized with relatively high resolutions while maintaining perceivably synchronous presentation of the processed image data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present text, still images, and/or video by displaying one or more image frames in sequence. For example, such electronic devices may include computers, mobile phones, portable media devices, tablets, televisions, virtual-reality headsets, and vehicle dashboards, among many others. In any case, to display an image, an electronic device may control light emission (e.g., luminance) of its display pixels based on corresponding image data.

The electronic device may process image data used when presenting the one or more images. When processing the image data, certain complex color transforms may be used to improve color image quality, processing operations may be used to adjust timing, or the like. Over time, as image data is handled both for a same image frame or for different image frames, skew may be introduced between portions of frames or frames generated by different display pipelines. Skew or inconsistencies between timing used by display pipelines may increasingly become perceivable to a user as display resolution increase since higher display resolutions may use more data, and thus take longer to process.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Very large, very fast display panels may consume a significant amount of image data. The amount of image data may even exceed the throughput capabilities of a single display pipeline. To combat this, an electronic device may include one or more display pipelines that respectively process image data to improve the perceived image quality of image frames presented using the image data while maintaining or improving throughput from the display pipelines. By using multiple display pipelines, a large number of relatively smaller displays, a relatively small number of larger displays, or any suitable combination thereof may be efficiently supported. Indeed, combining multiple smaller display pipelines and/or smaller processing cores may improve scalability and flexibilities of display capacities of an electronic device. However, synchronization of timing may be a concern when using multiple display pipelines and/or processing cores to generate synchronous images between the various displays and/or display panels. Furthermore, timing inconsistencies may be further exaggerated when the processed image data is used to drive adjacent displays or different portions of a same display, and thus may be perceivable to a user as a delay in image data or a mismatching of frame timing.

Techniques described herein may reduce or eliminate skew and a likelihood of timing differences between outputs from display pipelines. Indeed, two or more display pipelines may be coordinated to provide the throughput needed to supply very large, very fast display panels with image data. For example, two display pipelines may each supply image data to respective halves of such a display panel. To avoid tearing effects and other image artifacts, each display pipeline may be controlled to stay sufficiently synchronized. However, software-based synchronization methods may be limited in their ability to be scaled up for use in real-time decision making. When the electronic device includes multiple display pipelines, each display pipeline may include circuitry to exchange hardware-based synchronization signals. A set of signals may be obtained from every (dual pipe capable) display to every other (dual pipe capable) display. This enables for communication between two display pipes so they remain in sync. Furthermore, using hardware-based synchronization signals may enable scaling up even for operations that use real-time decisions, such as adaptive synchronization operations (e.g., operations to adjust a display's vertical refresh rate to a frame rate of a graphics card and/or of processing software as a way to reduce perceivable artifacts in presented image frames) and/or variable refresh rate operations (e.g., operations that enable dynamically changing refresh rates used to present image data on the displays based on the content of the image data).

Indeed, two display pipes operating in concert may be coordinated to make the same decision (e.g., both display pipelines have an image data packet and are ready or both are not ready). Each display pipeline may wait to perform certain operations until receiving the synchronization signals (e.g., mutually transmitted status signals). Delaying the operations until receiving the synchronization signals may eliminate or reduce a likelihood of one display pipeline moving on to perform a next operation when its ready before another display pipeline is similarly ready to also perform the next operation. By performing operations based on the synchronization signals, display pipelines may output image data in improved alignment relative to each other, and thus output image data may be used to generate image frames, or portions of image frames, that have less perceivable skew between each other. Using synchronization signals between the display pipelines, the existence of multiple display pipelines may become transparent to a user, and thus unperceivable in image outputs.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
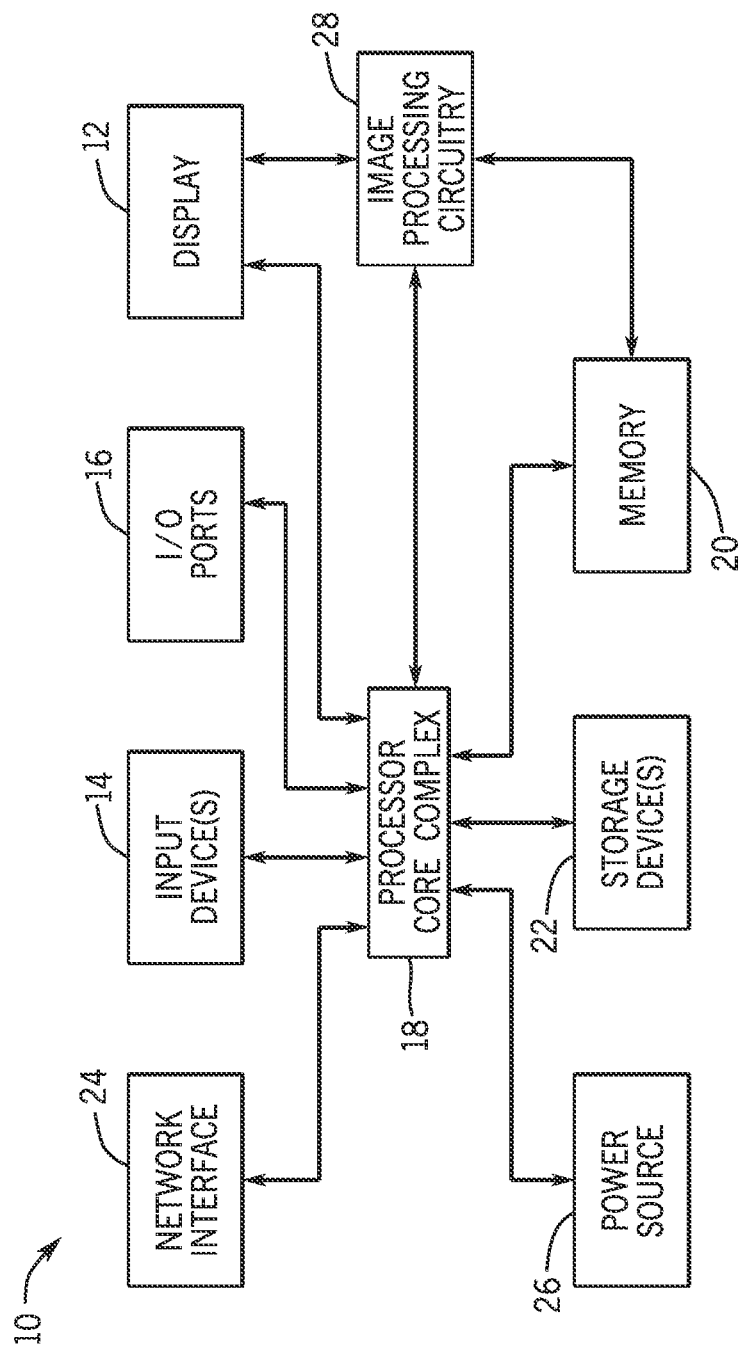
FIG. 1 is a block diagram of an electronic device with an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

An electronic device may include components that, in operation, consume electrical power. For example, electronic devices may include circuitry (e.g., image source, application processor) that render image frames by generating corresponding image data. Electronic devices may also include a display pipeline that processes the image data before the image data is used to display the image frame on an electronic display. The processing of the image data may improve the perceived image quality of the image frame. The display pipeline may use pipelined operations to process respective portions of data for output to the electronic display. For example, the display pipeline may sequentially process one or more portions of image data corresponding to one or more pixels of the electronic display. A first type of processing operation may be performed on a first portion of image data at least partially in parallel to a second type of processing operation being performed on a second portion of image data. Once the first type of processing operations are completed on the first portion of image data, the display pipeline may output the first portion of image data and perform the first type of processing operation on the second portion of image data.

After image processing is complete, the electronic display uses the processed image data when controlling light emission (e.g., luminance) of its display pixels to present a corresponding image frame. For example, in a liquid crystal display (LCD), electrical energy may be stored in the pixel electrode of a display pixel to produce an electric field between the pixel electrode and a common electrode, which controls orientation of liquid crystals and, thus, light emission from the display pixel. Additionally, in an organic light-emitting diode (OLED) display, electrical energy may be stored in a storage capacitor of a display pixel to control electrical power (e.g., current) supplied to a self-emissive component (e.g., OLED) and, thus, light emission from the display pixel.

Over time, electronic displays have increased in panel resolution since, as technology has progressed, more pixels are able to be designed to fit within a fixed area on an electronic display. However, as panel resolutions increase, larger demands are placed on pre-presentation processing operations used to prepare image data for use in presentation of an image. One way to meet the increased demand may be to distribute the processing of relatively large amounts of image data between one or more display pipelines. Indeed, an electronic display may be split into one or more display regions, and various combinations of display pipeline processing flows may be used to process image data for presented in the one or more portions. However, this increases processing complexity, thereby increasing a likelihood for perceivable skew or timing differences to result from presented image data output from the display pipelines.

To remedy this, synchronization operations between display pipelines may help reduce or eliminate skew and a likelihood of timing differences between outputs from display pipelines. In systems that include one or more display pipelines, each display pipeline may include circuitry to exchange hardware-based synchronization signals between processing components, which may be relatively faster to process and respond to than software-based signals since less time may be spent translating a signal to a hardware level layer. Certain processing operations may be paused until receiving the synchronization signals as part of synchronization operations. By performing operations based on a synchronization operation, each display pipeline may output processed image data in an alignment of timing which may be improved (i.e., less timing difference) relative to the other display pipeline(s). Improved alignment of timing between operations of respective display pipelines result in unperceivable skew or no skew when resulting image data is presented on one or more electronic displays. Furthermore, by using a hardware-based synchronization signal, race conditions or clock skew is reduced or eliminated relative to using software-based synchronization operations, improving synchronization of outputs from the display pipelines.

Many combinations of display pipelines and displays may benefit from systems and methods described herein. In a single pipe/single region operational mode, a single display pipeline processes portions of image data in parallel for a single display region that consumes a whole electronic display panel. In this example, parallel-running processes of a single display pipeline may exchange mutually transmitted status signals to align timing of operations, and thus synchronize operations.

In a single pipe/dual region operational mode, a single display pipeline may process image data using first operations performed in parallel with second operations, where the first operations process image data for a first of two display regions that together form a whole electronic display panel, and where the second operations process image data for a second of the two display regions. In this example, the operations may exchange mutually transmitted status signals to align timing of operations, and thus synchronize operations.

An another example, in a dual pipe/dual region operational mode, two display pipelines process the image data as opposed to one display pipeline using parallel operations. In this way, a first display pipeline may perform a first operation to generate first image data in parallel with a second operation performed by a second display pipeline to generate second image data. The first image data corresponds to a first of two display regions that together form a whole electronic display panel, and the second image data corresponds to a second of the two display regions. In this example, the first display pipeline and the second display pipeline may exchange mutually transmitted status signals to align timing of operations, and thus synchronize operations.

In a dual pipe, single region operational mode, two display pipelines generate subsets of image data for a same display region of an electronic display. The display pipelines may exchange mutually transmitted status signals to align timing of operations, and thus synchronize operations.

Furthermore, in a multi-pipe/multi-region operational mode, any number of display pipelines are used to generate image data for any number of regions. Each of the multiple pipes may exchange mutually transmitted status signals to align timing of operations, and thus synchronize operations.

A system controller may determine to operate one or more display pipelines into any of the above-described modes based on one or more electronic displays coupled to the electronic device. When the electronic displays are exchanged during a life cycle of the electronic device, the electronic device may include systems described herein to perform operations compatible with a wide variety and number of electronic displays. An electronic display may be exchanged for another electronic display when, for example, the electronic display performs undesirably and is to be replaced, when a wireless link is used to temporarily present an image generated by the electronic device to a new or remote electronic display, for video gaming systems when one may want to chance a television or display used to render the graphics for the game or the like. Each of these examples may use different configurations and arrangements to present image data, and user interaction with an electronic device may improve and be less complex when the electronic device is able to flexibly use a wide range of types of display panel to present image data.

To do so, a system controller may receive a parameter from the one or more electronic displays and use the parameter to determine a display configuration of one or more of the electronic displays. The system controller may operate the one or more display pipelines into one or more of the above-described modes, or otherwise adjust a configuration of the one or more display pipelines, based on the parameter. Furthermore, when adjusting the configurations of the display pipelines, the system controller may further base the configuration on status signals exchanged between the display pipelines.

Keeping the foregoing in mind, an electronic device 10 including an electronic display 12 (e.g., display device) is shown in FIG. 1. As is described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

The electronic display 12 may be any suitable electronic display. For example, the electronic display 12 may include a self-emissive pixel array having an array of one or more of self-emissive pixels. The electronic display 12 may include any suitable circuitry to drive the self-emissive pixels, including for example row driver and/or column drivers (e.g., display drivers). Each of the self-emissive pixel 82 may include any suitable light emitting element, such as a LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, a power source 26 (e.g., power supply), and image processing circuitry 28. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. The image processing circuitry 28 (e.g., a graphics processing unit) may be included in the processor core complex 18.

As depicted, the processor core complex 18 is operably coupled with local memory 20 and the main memory storage device 22. Thus, the processor core complex 18 may execute instruction stored in local memory 20 and/or the main memory storage device 22 to perform operations, such as generating and/or transmitting image data. As such, the processor core complex 18 may include one or more general purpose microprocessors, one or more application specific integrated circuits (ASICs), one or more field programmable logic arrays (FPGAs), or any combination thereof.

In addition to instructions, the local memory 20 and/or the main memory storage device 22 may store data to be processed by the processor core complex 18. Thus, the local memory 20 and/or the main memory storage device 22 may include one or more tangible, non-transitory, computer-readable mediums. For example, the local memory 20 may include random access memory (RAM) and the main memory storage device 22 may include read-only memory (ROM), rewritable non-volatile memory such as flash memory, hard drives, optical discs, and/or the like.

As depicted, the processor core complex 18 is also operably coupled with the network interface 24. The network interface 24 may communicate data with another electronic device and/or a network. For example, the network interface 24 (e.g., a radio frequency system) may enable the electronic device 10 to communicatively couple to a personal area network (PAN), such as a Bluetooth network, a local area network (LAN), such as an 1622.11x Wi-Fi network, and/or a wide area network (WAN), such as a 4G or Long-Term Evolution (LTE) cellular network.

The processor core complex 18 is operably coupled to the power source 26. The power source 26 may provide electrical power to one or more components in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter.

The processor core complex 18 is operably coupled with the one or more I/O ports 16. The I/O ports 16 may enable the electronic device 10 to interface with other electronic devices. For example, when a portable storage device is connected, the I/O port 16 may enable the processor core complex 18 to communicate data with the portable storage device.

The electronic device 10 is also operably coupled with the one or more input devices 14. The input device 14 may enable user interaction with the electronic device 10, for example, by receiving user inputs via a button, a keyboard, a mouse, a trackpad, and/or the like. The input device 14 may include touch-sensing components in the electronic display 12. The touch sensing components may receive user inputs by detecting occurrence and/or position of an object touching the surface of the electronic display 12.

In addition to enabling user inputs, the electronic display 12 may include one or more display panels each having one or more display pixels. Each display panel may be a separate display device or one or more display panels may be combined into a same device. The electronic display 12 may control light emission from the display pixels to present visual representations of information, such as a graphical user interface (GUI) of an operating system, an application interface, a still image, or video content, by displaying frames based on corresponding image data. As depicted, the electronic display 12 is operably coupled to the processor core complex 18 and the image processing circuitry 28. In this manner, the electronic display 12 may display frames based on image data generated by the processor core complex 18 and/or the image processing circuitry 28. Additionally or alternatively, the electronic display 12 may display frames based on image data received via the network interface 24, an input device 14, an I/O port 16, or the like.

Figure 2:
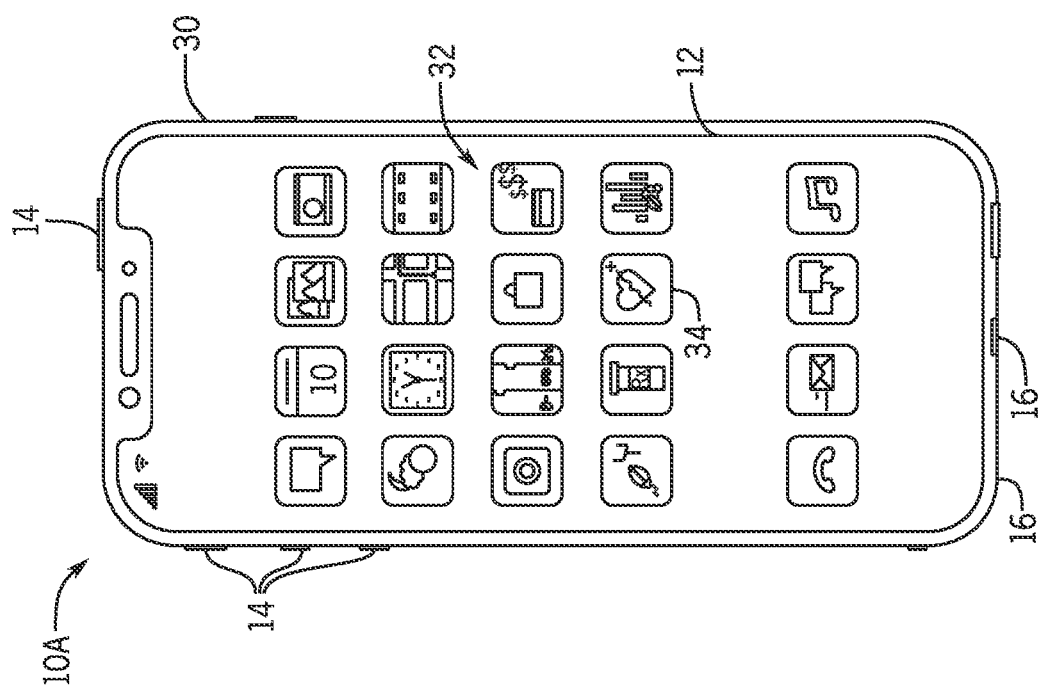
FIG. 2 is an example of the electronic device of FIG. 1, in accordance with an embodiment.

As described above, the electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, and/or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage and/or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 may be accessed through openings in the enclosure 30 and may include, for example, an audio jack to connect to external devices.

Figure 3:
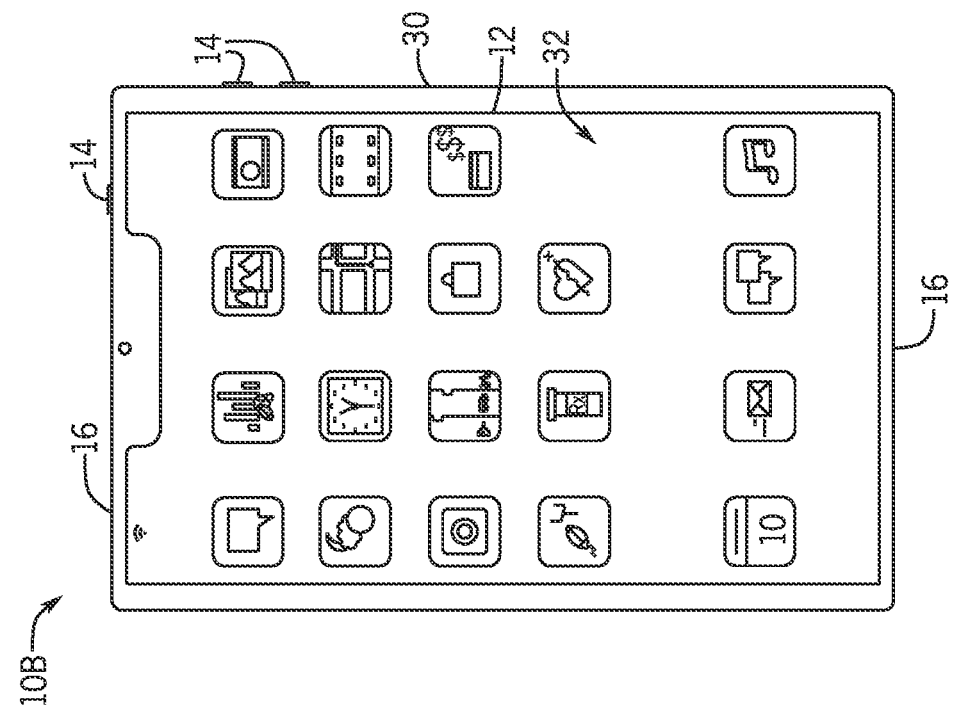
FIG. 3 is another example of the electronic device of FIG. 1, in accordance with an embodiment.
Figure 4:
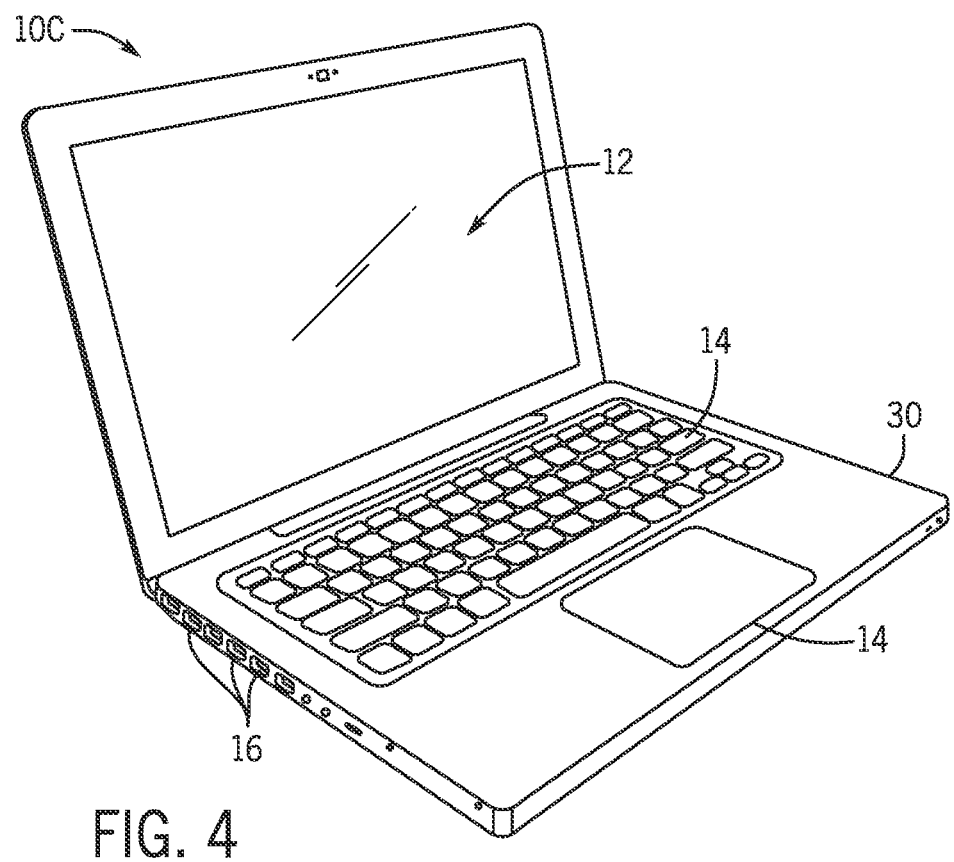
FIG. 4 is another example of the electronic device of FIG. 1, in accordance with an embodiment.
Figure 5:
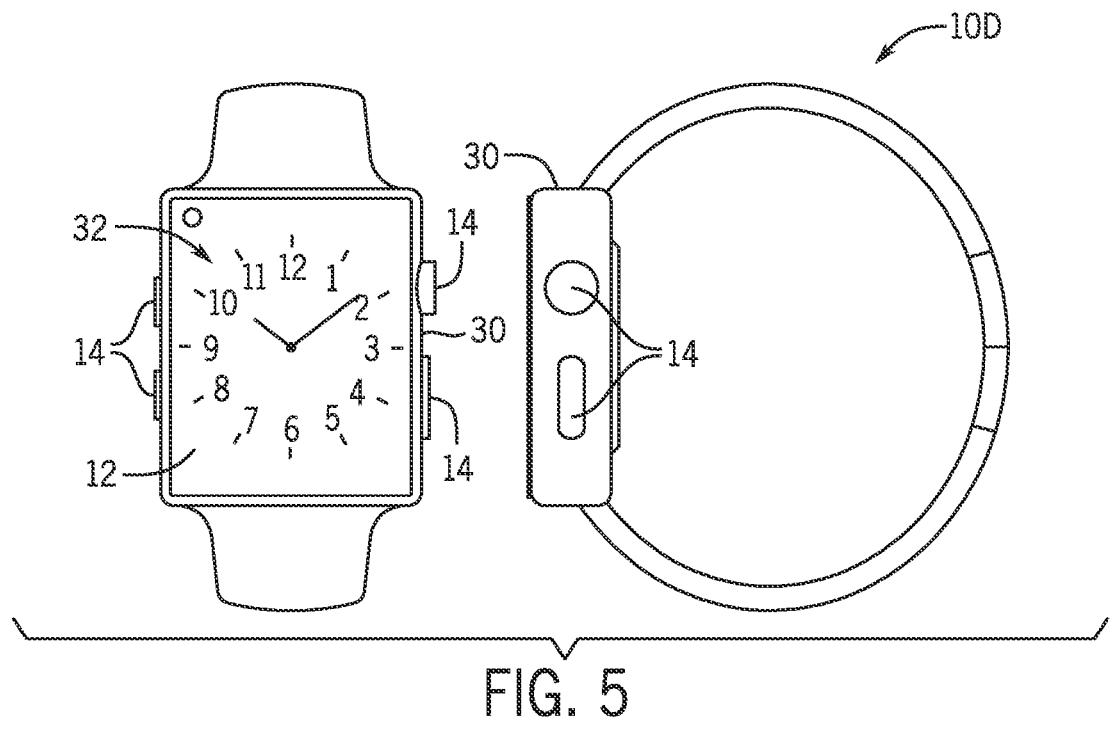
FIG. 5 is another example of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MAC-BOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

As described above, electronic displays 12 have generally increased in resolution over time, increasing amounts of resources consumed when processing image data for presentation. The electronic device 10 may have a finite amount of processing resources. Systems and methods described herein may conserve the finite amount of processing resources and increase operational flexibility in applying or using the processing resources at least in part by improving operations of display pipelines.

Indeed, to improve resource consumption of image processing operations, the electronic device 10 may process image data uses parallel processing. In some cases, the parallel processing may involve separating image data into two portions, processing each portion in parallel, and merging the portions before driving the electronic display 12 to present according to the image data. However, in other cases, image data is generated for a frame and divided into portions of data. The portions of data may be respectively used for drive a left region of a display panel and a right region or sub-panel of the same display panel.

Figure 6:
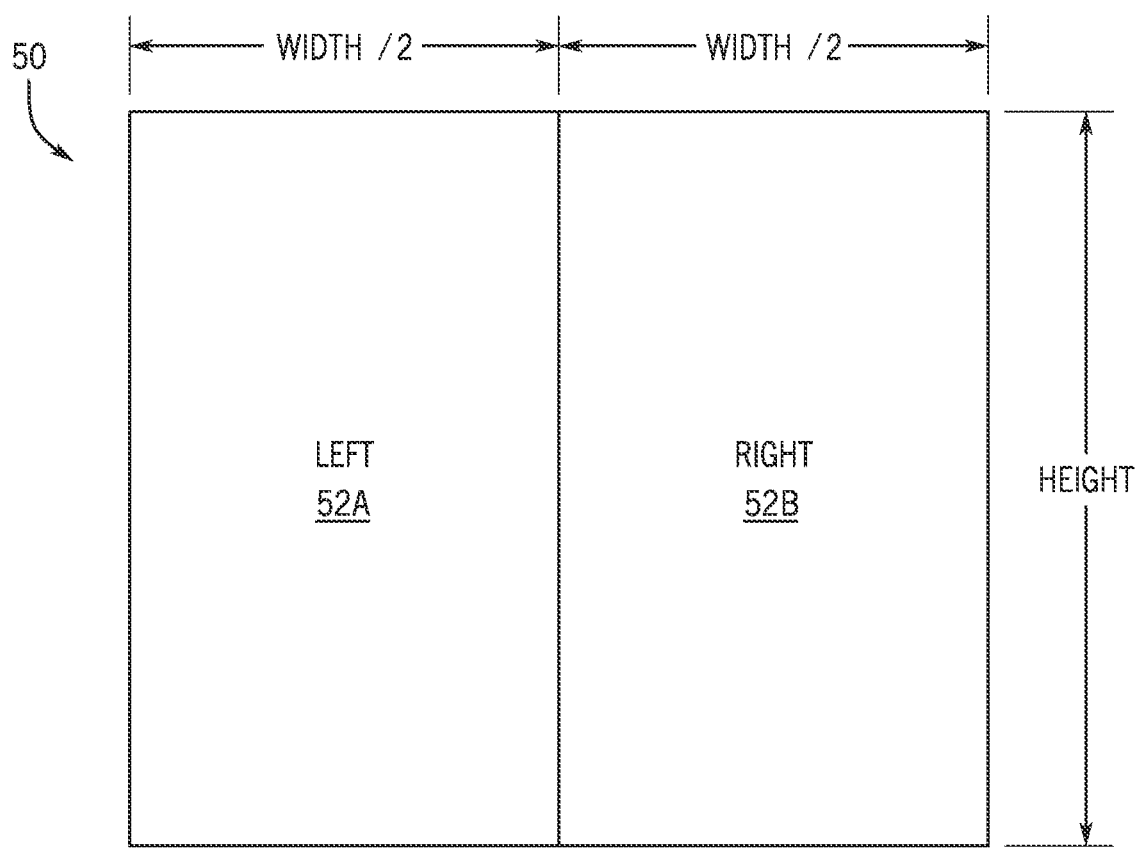
FIG. 6 is a diagrammatic representation of a display panel having two display regions, in accordance with an embodiment.

To elaborate, FIG. 6 is a diagrammatic representation of a display panel 50 that has a left region 52A and a right region 52B. The portions of data may be respectively used for driving the left region 52A and the right region 52B without the data being first merged together, where each region 52 may have a matching or equal width (e.g., width of the display panel multiplied by 50 percent (%)) value and a matching or equal height value or may have varied heights and/or widths. The electronic device 10 may include one or more display pipelines 60 that process image data for the respective regions 52 in parallel. It is noted that in some cases, the widths and/or heights may be different or no equal, for example, the width and/or height difference between the left region 52A and the right region 52B may equal 32 pixels or any suitable value. In some cases, the regions 52A and 52B may be driven by separate pairs of display drivers (e.g., row driver, column driver).

The display panel 50 may include many pixels that operate to emit light in response to image data to present an image frame. The display panel 50 may presenting according to image data for a single region (e.g., combined regions 52A and 52B) as a single panel display, for dual regions (e.g., region 52A separate from region 52B) as a multi-panel display, or for multiple regions (e.g., three or more regions) as a multi-panel display. Dividing processing of image data between the various regions of the display panel 50 may be based on topology of the display itself. Indeed, in some cases, the electronic device 10 may have an electronic display that can be exchanged or replaced at will, and thus have to update its processing operations based on the type of electronic display(s) 12 coupled to the electronic device 10.

In any of these cases, the different portions of image data processed in parallel may be used to present an image frame on the electronic display 12 after processing. As described above, parallel processing may introduce skew and timing misalignments. To mitigate skew and timing misalignments, different signals and timings may be synchronized between image frames presented via the regions 52 and/or processed via the display pipelines, as will be appreciated.

Figure 7:
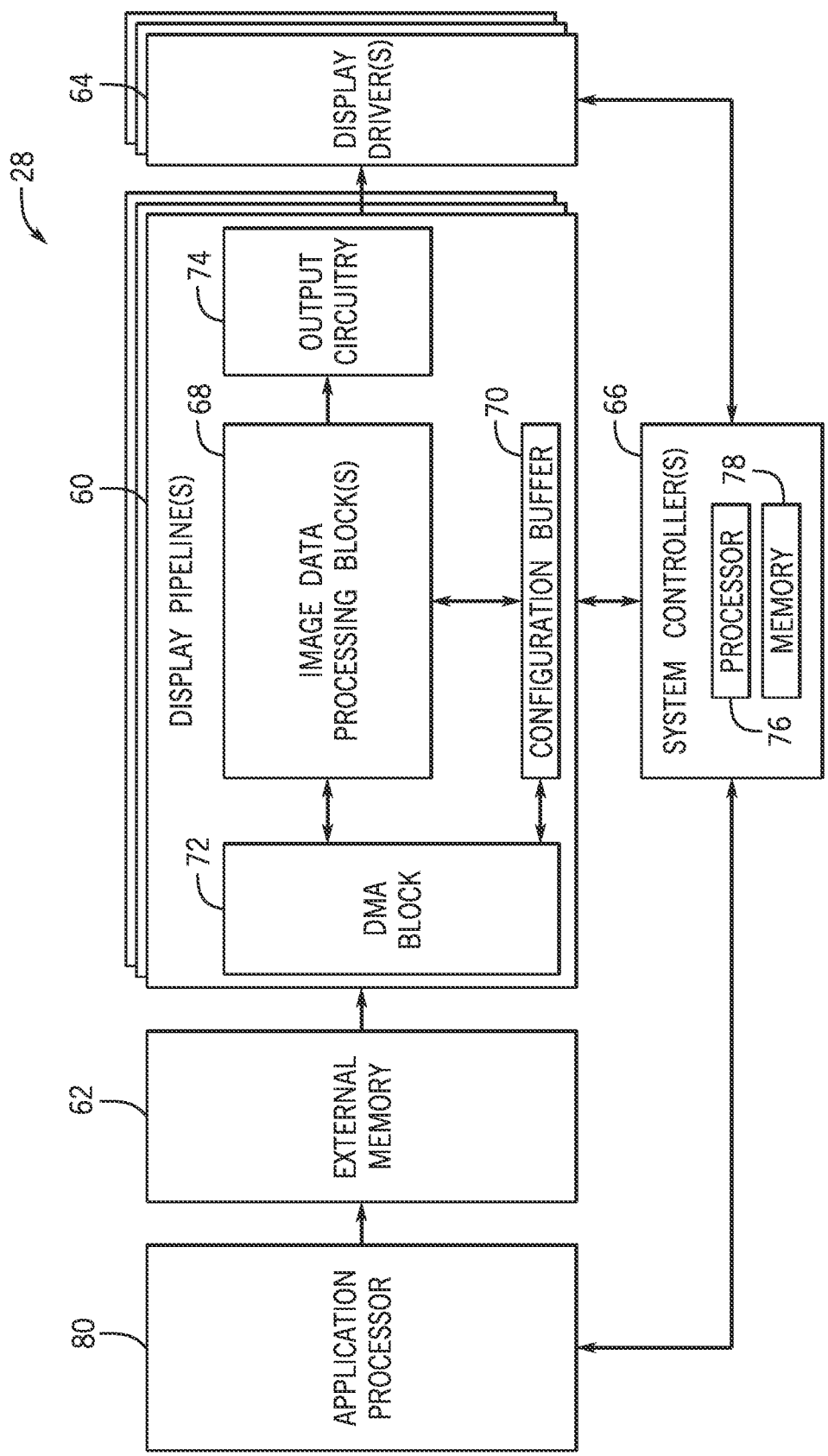
FIG. 7 is a block diagram of a portion of the electronic device of FIG. 1 including the image processing circuitry, in accordance with an embodiment.

To elaborate, FIG. 7 illustrates a block diagram of the image processing circuitry 28 that includes one or more display pipelines 60. As depicted, the image processing circuitry 28 also includes an external memory 62 (e.g., local memory 20), one or more display drivers 64, and a system controller 66. The system controller 66 may control operations of the display pipelines 60, the external memory 62, the display drivers 64, and/or other portions of the electronic device 10, and may be a, or may be part of a, control system, a processor, a processing unit, a processor core complex 18, or the like. It is noted that the display pipeline 60 may include control circuitry, such as control circuitry similar to the system controller 66 but particular to management of communication between components of the display pipeline 60, such as between image data processing blocks 68, configuration buffer 70, direct memory access (DMA) block 72, output buffer 74, or any combination thereof.

The system controller 66 may include a controller processor 76 and controller memory 78. The controller processor 76 may execute instructions stored in the controller memory 78. The controller processor 76 may be included in the processor core complex 18, the image processing circuitry 28, a timing controller in the electronic display 12, a separate processing module, or any combination thereof. The controller memory 78 may be included in local memory 20, the main memory storage device 22, external memory 62, internal memory of a display pipeline 60, a separate tangible, non-transitory, computer readable medium, or any combination thereof. Although depicted as a system controller 66, in some cases, several separate system controllers 66 may be implemented to control operation of the electronic device 10.

The display pipeline 60 may operate to process image data to improve perceived image quality of a resulting image presented on the electronic display 12. An application processor 80 generates and stores the image data in the external memory 62 for access by the display pipeline 60. The display pipeline 60 may be implemented via circuitry, for example, packaged as a system-on-chip (SoC). Although shown as a part of the image processing circuitry 28, the display pipeline 60 may be included in the processor core complex 18, the image processing circuitry 28, a timing controller (TCON) in the electronic display 12, other one or more processing units, other processing circuitry, or any combination thereof.

The display pipeline 60 may include a direct memory access (DMA) block 72, a configuration buffer 70, an output buffer 74, and one or more image data processing blocks 68. The various blocks of the display pipeline 60 may be implemented using circuitry and/or programmable instructions executed by a processor. The display pipeline 60 may retrieve image data from the external memory 62 and may process the image data before transmission to the display driver 64. The image data processing blocks 68 may process image data to compensate or adjust the perceivable appearance of a resulting image based on current operating and/or environmental conditions, such as to adjust the image data depending on the color or brightness of ambient light.

As described above, the electronic device 10 may include one or more display pipelines 60 to process image data for one or more portions of one or more different electronic displays 12. Image frame alignment and perceived image quality may improve when processing operations are based on synchronization signals exchanged between display pipelines.

Figure 8:
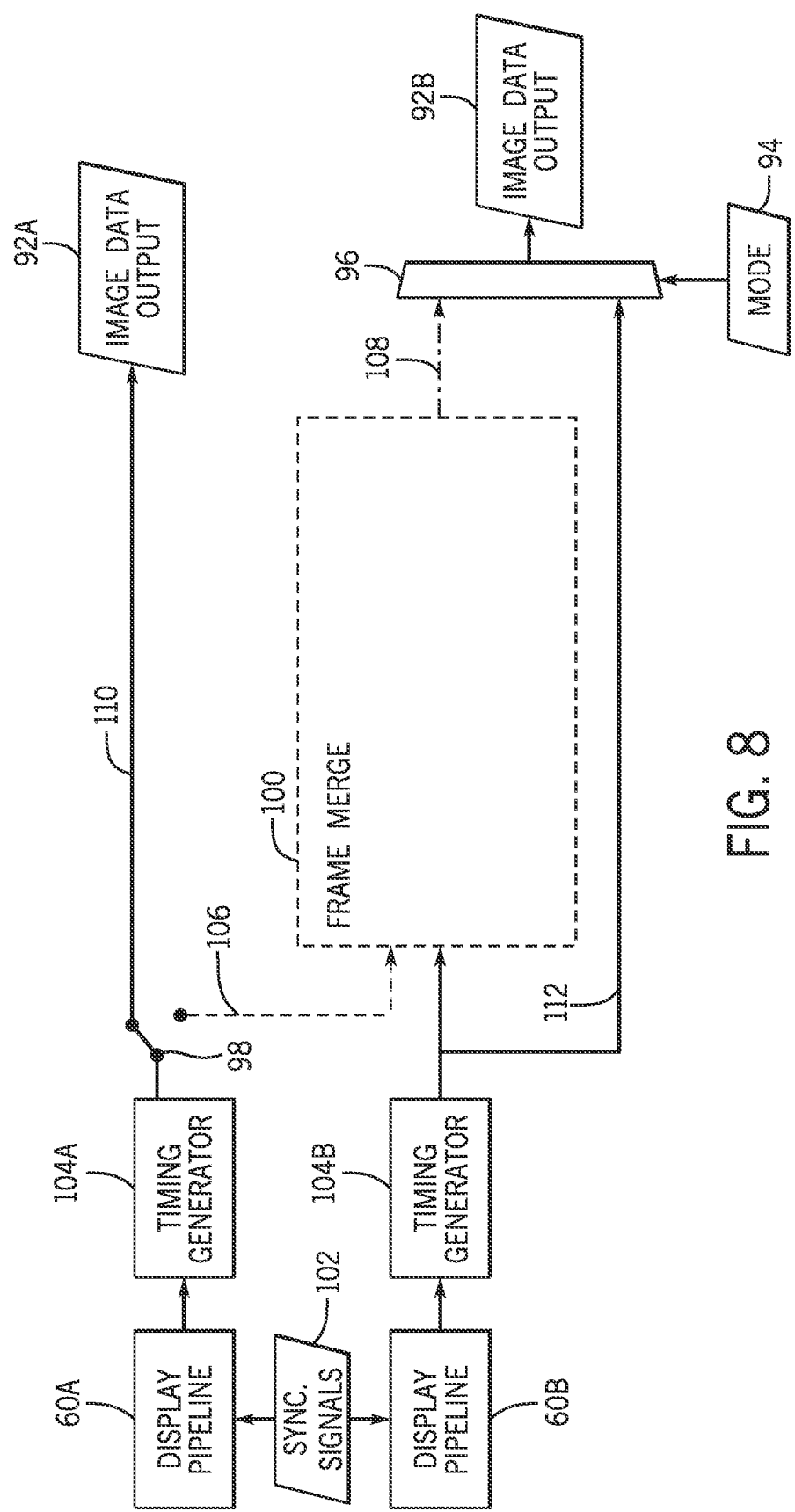
FIG. 8 is a block diagram of a portion of the image processing circuitry of FIG. 7 operated in a first mode to transmit separate video streams or image data streams, in accordance with an embodiment.

To elaborate, FIG. 8 is a block diagram of a portion of image processing circuitry 28 able to operate with one or more display pipelines 60 to generate image data for one or more regions. For example, a display pipeline 60A (e.g., a first display pipeline) may generate image data output 92A for the left region 52A and a display pipeline 60B (e.g., a second display pipeline) may generate image data output 92B for the right region 52B. The display pipelines 60 may be operated in a dual pipe and dual region operational mode based on a mode signal 94 transmitted from, for example, the system controller 66. The mode signal 94 may operate the multiplexing circuitry 96 and/or a switch 98 to bypass frame merge circuitry 100, which causes the outputs from each display pipeline 60 to output to respective display driver 64.

Figure 9:
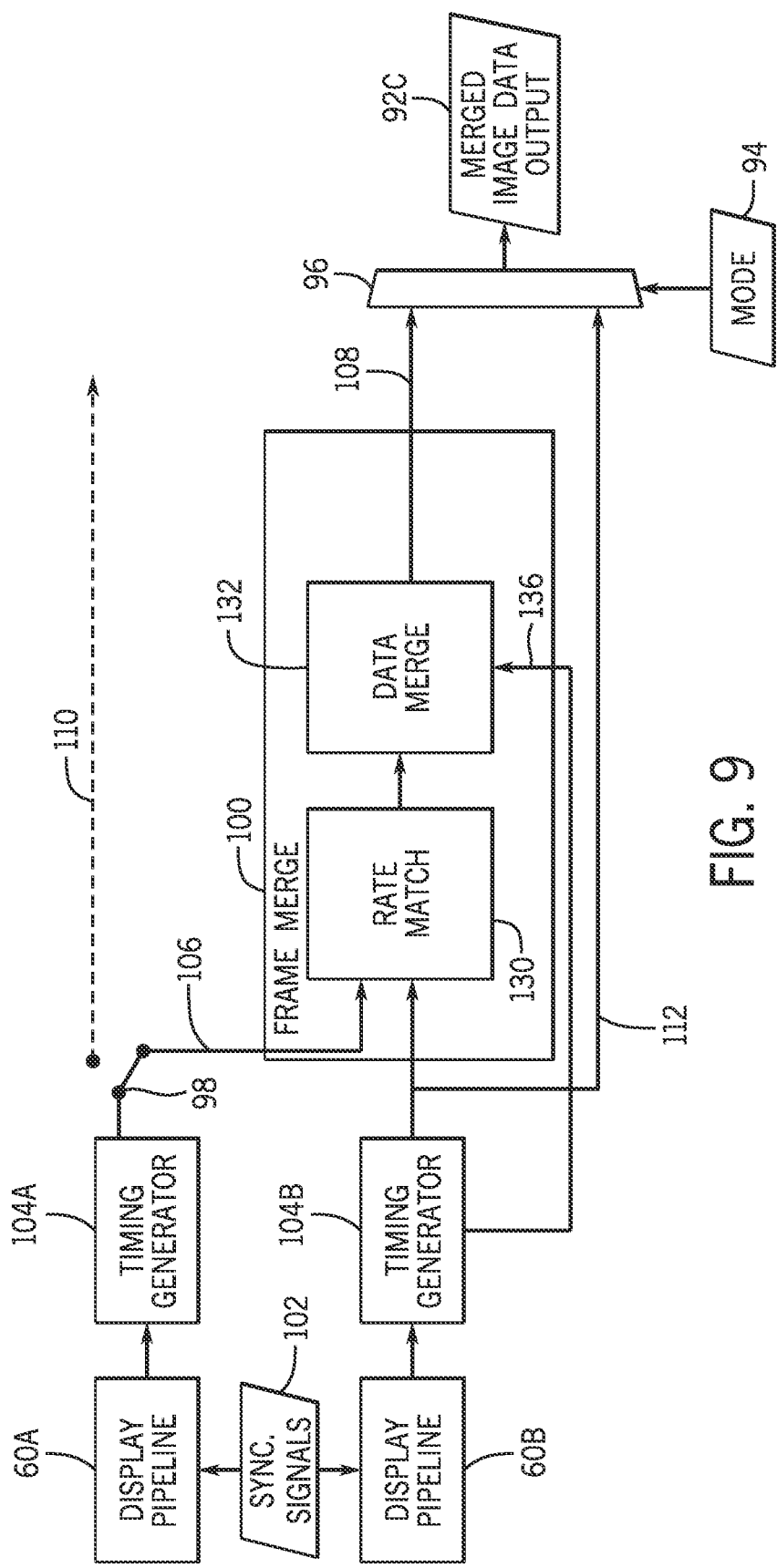
FIG. 9 is a block diagram of the portion of the image processing circuitry of FIG. 8 operated in a second mode to transmit a merged video stream or a merged image data stream, in accordance with an embodiment.

It is noted that the multiplexing circuitry 96, or any switch or multiplexer described herein may be deployed in a device as any suitable switching device including any suitable type of transistor, logic gate, or the like, and thus may receive additional or different control signals than the mode signal 94. It is also noted that the circuitry shown may be flexible in its application based on whether output image data bypasses a frame merge circuitry 100. The frame merge circuitry 100 may be thought of as selectively enabled frame merge circuitry 100 since sometimes it is operated to receive and merge input image data but other times it's bypassed. When unselected, the frame merge circuitry 100 may be disabled by the system controller 66, such as to reduce power consumed when not in use. Indeed, the system controller 66 may determine to not bypass and/or to enable the frame merge circuitry 100 based on the topology of the electronic displays 12 communicatively coupled to the electronic device 10. As illustrated in FIG. 9 and as will be appreciated, in the non-bypass or enabled mode, the system controller 66 may operate the multiplexing circuitry 96 and the switch 98 to not bypass the frame merge circuitry 100, causing generation of a merged image data output as opposed to separate image data outputs 92.

Image data output from each of the display pipelines 60 are respectively retimed by timing generators 104 (104A, 104B). Additional processing circuitry may be disposed between the display pipelines 60 and the corresponding timing generator 104 and/or the display drivers 64. When operated in this way, path 106 and path 108 are unused and path 110 and path 112 are used.

The display pipeline 60A may perform first operations to generate first image data using its respective image data processing blocks 68 in parallel with second operations performed by the display pipeline 60B to generate second image data using its respective image data processing blocks 68. The first and second operations may be performed based on mutually transmitted synchronization signals 102 (e.g., synchronizing signals). When performed based on the synchronization signals 102, the image data output 92A may be characterized with less skew or timing differences relative to the image data output 92B over time, as will be appreciated.

Sometimes the system controller 66 may determine to operate the display pipelines 60 to consolidate image data outputs into fewer datasets. Consolidation of image data may be desired when the electronic device 10 changes its electronic display 12 from multiple electronic displays 12 to one electronic display 12 and/or changes a number of regions used to present image frames on the electronic display 12. To do so, the system controller 66 may operate the switch 98 and multiplexing circuitry 96 to route image data output from the display pipelines 60 to the frame merge circuitry 100.

To elaborate, FIG. 9 is a block diagram of the portion of image processing circuitry 28 from FIG. 8 now operated in a dual pipe/single region operational mode. Although two are shown, it should be understood that any suitable number of display pipelines 60 may be used to generate a merged video stream or, referring to FIG. 8, separate video stream outputs. The display pipeline 60A may generate image data for the left region 52A and the display pipeline 60B may generate image data for the right region 52B. However, in this example, the system controller 66 has operated the image processing circuitry 28 to not bypass the frame merge circuitry 100, which may pause or stop use of path 110 (as indicated by the dashed line). When used, the frame merge circuitry 100 combined image data outputs from respective display pipelines 60 to be used in driving a whole display panel 50 without regional divisions.

Similar to FIG. 8, the display pipeline 60A may perform first operations to generate first image data using its image data processing blocks 68 in parallel with second operations performed by the display pipeline 60B to generate second image data using its image data processing blocks 68. The first and second operations may be performed based on mutually transmitted synchronization signals 102. Image data generated by the display pipeline 60A is routed through the switch 98 to the frame merge circuitry 100 via the path 106 and is no longer transmitted via the path 110. The frame merge circuitry 100 may merge video interfaces, reconstruct the video timing of the merged output from the frame merge circuitry 100, adjust the image data outputs to have substantially similar to equal pixel rates and/or line times (e.g., row load time), or the like, before transmitting the image data as merged image data output 92C (e.g., merged video stream when image data forms a video stream). It is noted that a pixel rate may correspond to a speed or rate at which image data is transmitted to pixels of the display 12, where a full frame worth of image data for pixels may be transmitted within one refresh cycle of the pixel rate.

Explaining further, the generated image data from path 106 is received by rate match circuitry 130. The rate match circuitry 130 also receives data from the display pipeline 60B, such as from the timing generator 104B. The rate match circuitry 130 may include a first-in first-out buffer to align (e.g., retime) incoming data to its clocking rate. Vertical timing is substantially aligned across the display pipelines 60 and may be defined by a group of timing parameters that set how much time it takes to present an entire image frame. However, horizontal timing may be misaligned between outputs from display pipelines 60 and may be defined by a group of timing parameters that set how much time it takes to present each line (e.g., row) of a respective image frame. Horizontal timing may be adjusted by the rate match circuitry 130 to improve alignment of timing between respective incoming data to generate a merged output. In some cases, dithering techniques may be used to align the horizontal timing. These may involve alternating horizontal timings used as a way to help mask differences in timing. For example, alternating between timing=value and timing=value+offset for respective rows of the electronic display 12. Other operations that may be performed by the rate match circuitry 130 includes merging the outputs from the timing generators 104 at a frame rate matching that of the electronic display 12 and according to horizontal timing of the electronic display 12. In some cases, the rate match circuitry 130 may target keeping a pixel rate and/or line time substantially similar or equal for two or more of the display pipelines 60.

The rate match circuitry 130 outputs to data merge circuitry 132, which may perform operations such as video line merging, display stream compression (DSC) slice merging (e.g., to merge slices generated from the display pipelines 60 performing DSC operations), or the like, based on feedback transmitted via path 136. For example, DSC slice merge operations may be used to generate the merged image data output 92C when each display pipeline 60 is generating at least two DSC slices. The data merge circuitry 132 may add padding data when a width of a respective electronic display 12 is not evenly divisible into the desired number of slices and/or when an amount of image data loss is expected to occur in transmission to one or more displays 12. DSC slice merge operations may be used to merge DSC slices into one rasterized DSC bitstream which corresponds to an entire display panel 50. When DSC slice merge operations are enabled, such as via feedback transmitted via path 136, individual image frames may be converted into slices before being encoded and output from each display pipeline 60.

After the frame merge circuitry 100 processes the two image data streams, the pixel rate of the merged image data output 92C is twice the pixel rate of each individual data stream received at the frame merge circuitry 100. The merged image data output 92C from the data merge circuitry 132 may be transmitted to one or more corresponding display drivers 64 operated to drive the electronic display 12 based on the merged image data output 92C. In some cases, certain slice data may depend on data of a preceding slice. For example, predictive encoding operations may use slices with content that depends on a partial or full repeat of a previously transmitted slice of image data. In cases where predictive encoding is used, less data may be used overall to convey a compressed video stream, and thus may be advantageous to use in some systems.

In some cases, the system controller 66 may program compression operations of the data merge circuitry 132 based on a configuration of a communicative link between the electronic device 10 and the electronic displays 12, where the communicative link, although not particularly depicted, may be used to transmit the merged image data output 92C from the multiplexing circuitry 96 to the electronic display 12. For example, when the communicative link is a wireless link, compression (e.g., encoding) operations may be used to reduce an amount of data transmitted via the wireless link, and thus increasing a likelihood of faster data transmission and/or reducing a likelihood of dropped packets or lost data from the transmission. Compressing data before transmitting the merged image data output to one or more electronic displays 12 may also improve operations when the communicative link is wired and has a constrained number of physical wires coupled between the electronic device 10 and the electronic displays 12 since more data may be transmitted via a same number of physical wires compared to when the data is uncompressed.

Figure 10:
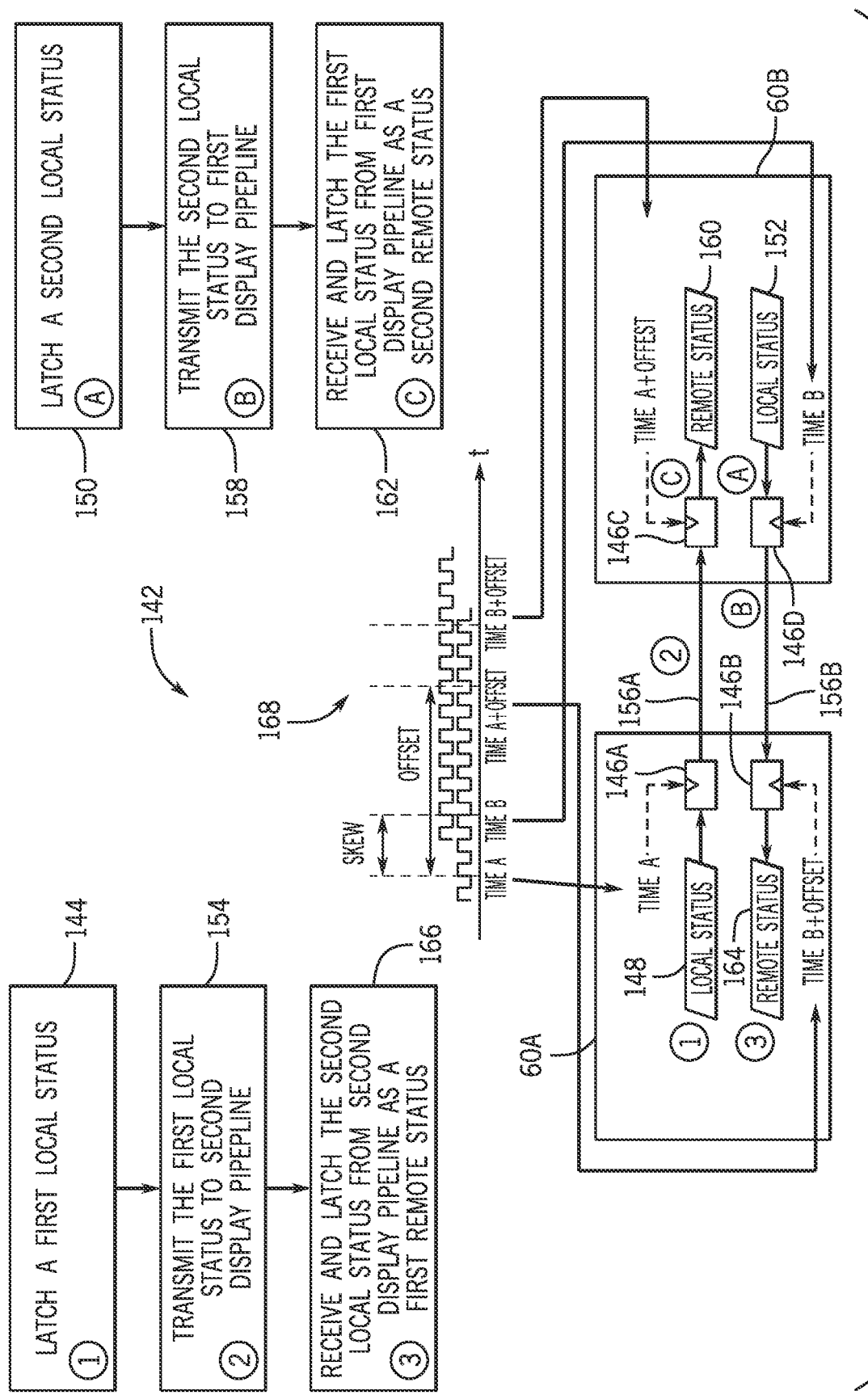
FIG. 10 is a diagrammatic representation of example display pipelines of FIG. 7 being operated to exchange status signals in a hardware-based synchronization operation, in accordance with an embodiment.

As described above, in any of these examples, the display pipelines 60 operate to process image data based on the mutually transmitted synchronization signals 102. FIG. 10 is a diagrammatic representation 142 of the display pipelines 60 being operated to exchange the synchronization signals 102 during a hardware-based synchronization operation. Although shown as a sequence of operations, it is noted that additional or alternative operations may be used to produce similar results. Furthermore, FIG. 10 shows generally status signals, and later figures discuss more particular examples of processing operations and status signals referenced during the processing operations. For ease of description, consider that each display pipeline 60 generates its own local status signals and that upon transmission, the local status is referred to as a remote status to be received by another display pipeline 60.

Display pipelines 60 generally perform operations based on its own local statuses, however this may introduce timing differences and skew into image data outputs when two or more display pipelines 60 are operating on image data for a same image frame. For example, the display pipeline 60B may update its own statutes some amount of time before the display pipeline 60A. There may also be issues with a status updating itself after a second status is reported, making a result outdated. Operationally, these delays and skews may be cured or made less likely to occur when display pipeline 60 operation is dependent on statuses from multiple display pipelines 60.

For example, the display pipeline 60A may latch (at block 144), at flip-flop 146A, its own local status 148 and the display pipeline 60B may latch (at block 150), at flip-flop 146D, its own local status 152. The latching may occur in response to a rising (or falling) edge of a respective clocking signal, where an example is visualized in inset plot 168. Indeed, flip-flop 146A may latch at a rising edge of the clocking signal at time A (represented by a clocking input "Time A" to the flip-flop 146A) while flip-flop 146D may latch at a rising edge of another clocking signal at time B. The two clocking signals may be substantially similar or the same as one another but may be offset in time up to a set amount, such as a skew equal to 40 clock cycles. Distribution circuitry (not shown) may propagate the clocking signals such that the corresponding latches 146B and 146C latch a set duration of time later, as represented by "offset" in the figure. Indeed, the local status 152 may be latched a configurable number of clock cycles after the local status 148 is latched, for example the signal that triggers the latching at flip-flop 146A may change state at a substantially similar or same time as the signal that triggers the latching at flip-flop 146D or may lead by a number of clock cycles. For example, the signal that triggers the latching at flip-flop 146A (e.g., clock signals visualized in inset plot 168) may be permitted to transmit at a time, or may change state at a time, that is a threshold time duration from the signal that triggers the latching at flip-flop 146D, such as within 10-100 nanoseconds (ns) of the other or any suitable defined threshold time duration, within a time duration corresponding to 20 clocking cycles or any suitable number of clocking cycles, or the like. The local status 148 and the local status 152 may respectively correspond to states of different control signals, respective states of the display pipelines 60, values read from different registers, a combination thereof, or the like. For example, the local status 148 may indicate a current state of the display pipeline 60A, such as that the display pipeline 60A is idle, ready for a configuration file to be loaded into its configuration buffer 70, is not processing next image data, has an empty time stamp queue, is ready to be powered-off, or the like. Each respective display pipeline 60 may maintain one or more statuses that may be exchanged with other display pipelines 60 of the same electronic device 10, as part of a "synchronization operation," to help delay operation until each display pipeline 60 participating in the synchronization operation reports its status and has a suitable status for the particular operation, such that each respective operation of the display pipelines 60 may be performed in lockstep with each other and thus reduce a likelihood of image data being presented with perceivable delays. For example, the electronic device 10 may delay powering off image processing circuitry 28 until each display pipeline 60 reports a status indicating that each is ready for powering off.

To elaborate, the local status 148 is transmitted via path 156A (at block 154) and the local status 152 is transmitted via path 156B (at block 158). The latch 146C latches the received local status 148 as a remote status 160 (at block 162) and the latch 146B latches the received local status 152 as a remote status 164 (at block 166). The remote status 164 may be received a number of clock transitions or cycles (e.g., represented by "offset") after a time at which the local status 148 is latched, and similarly for the local status 152 and the remote status 160. An example delay between example clocking signals used to latch the local and remote statuses 148, 152, 160, 164 is visualized in inset plot 168. Each display pipeline 60 may pause operations at least until receiving both the local status and the remote status and may continue to pause some operations until receiving a desired combination of statuses (e.g., until a condition is met for one or more of the statuses). By pausing operations until one or more statuses are received from other display pipelines 60, relative processing delays between display pipelines 60 may be reduced or eliminated without directly computing the processing delays, further saving processing resources and improving operational efficiency of the electronic device 10.

Figure 11:
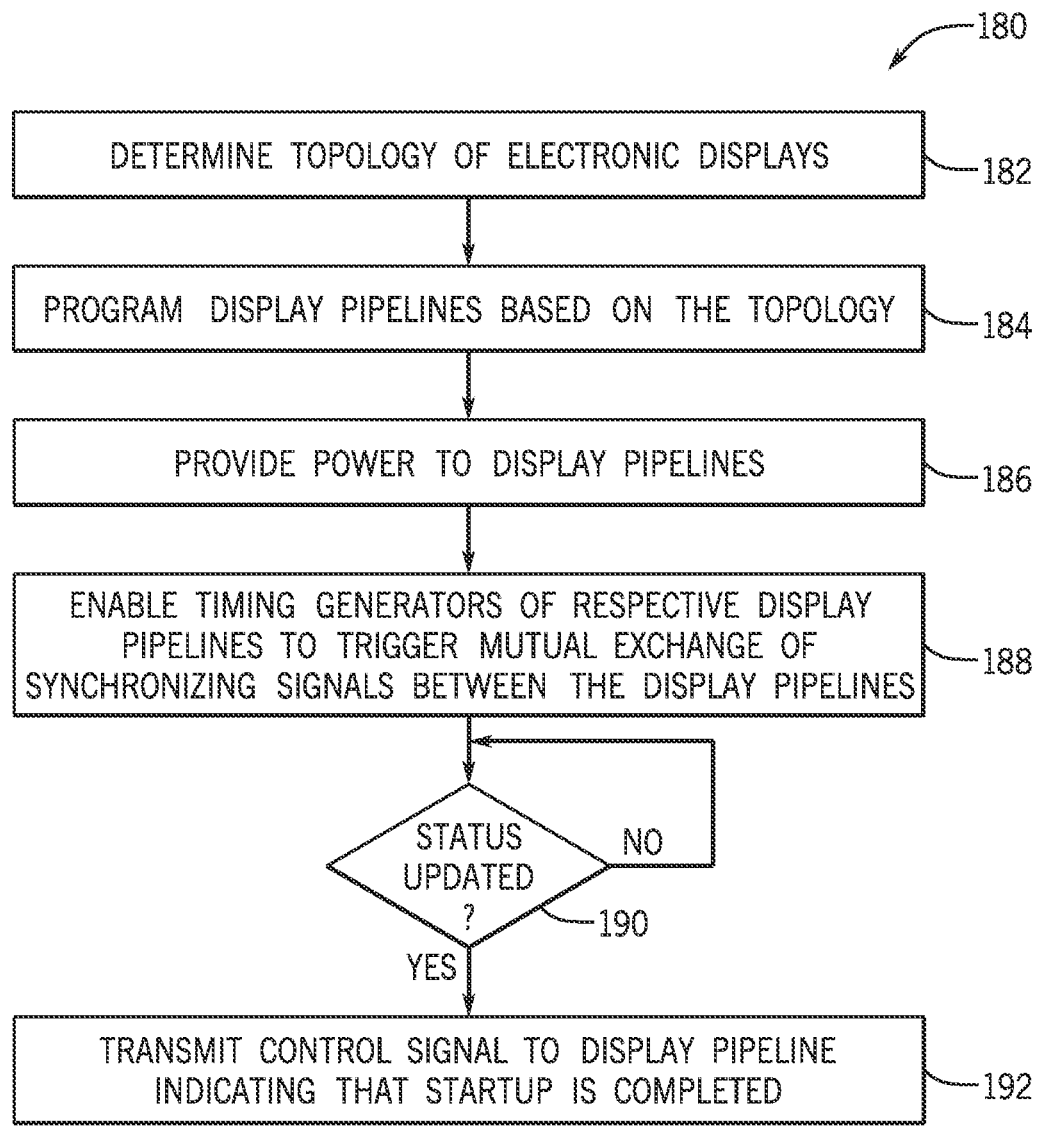
FIG. 11 is a flow diagram of a process for powering on two or more display pipelines of FIG. 7 based on the synchronization operation generally described in FIG. 10, in accordance with an embodiment.
Figure 12:
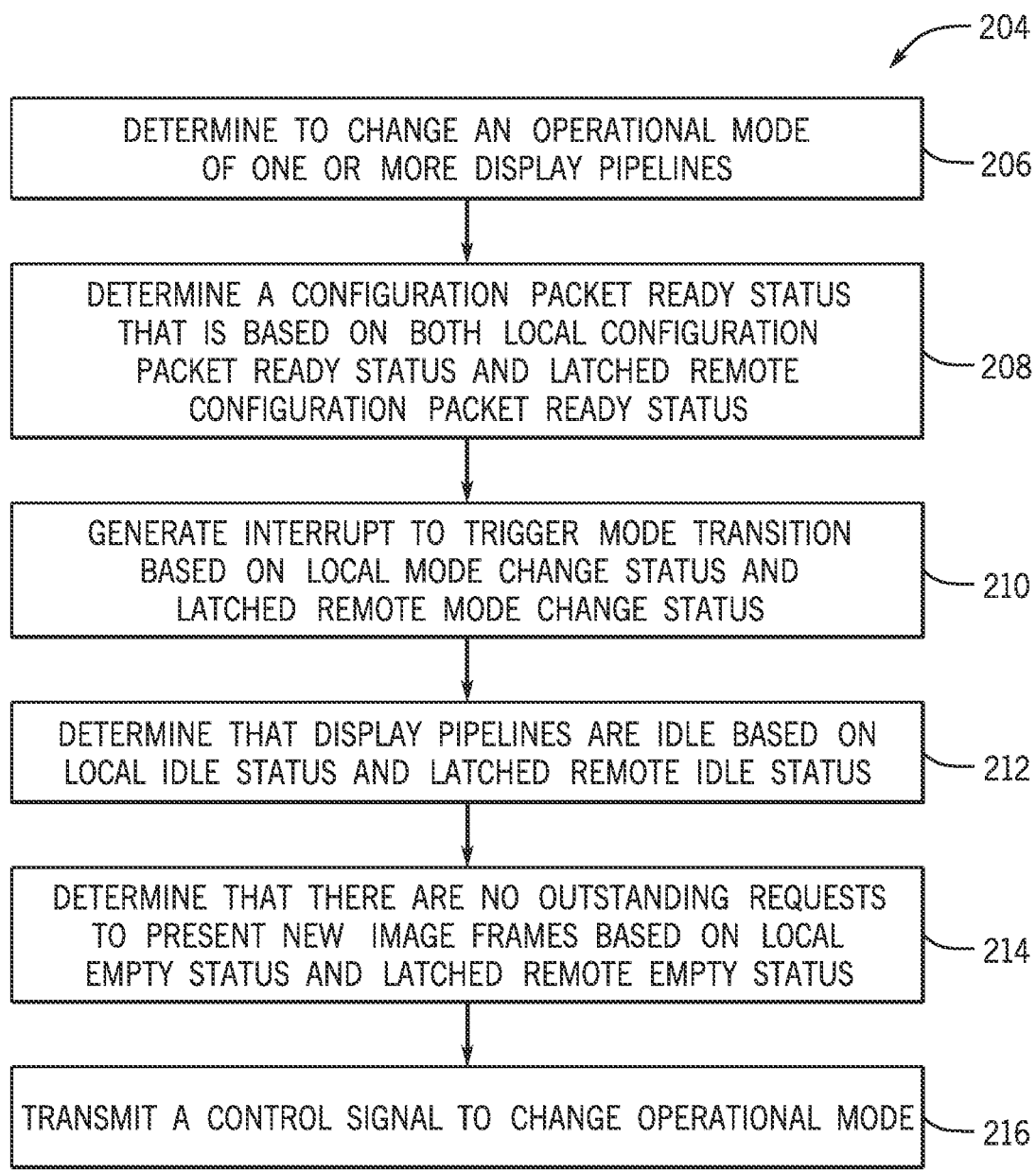
FIG. 12 is a flow diagram of a process for changing an operation mode of the two or more display pipelines of FIG. 7 based on the synchronization operation generally described in FIG. 10, in accordance with an embodiment.
Figure 13:
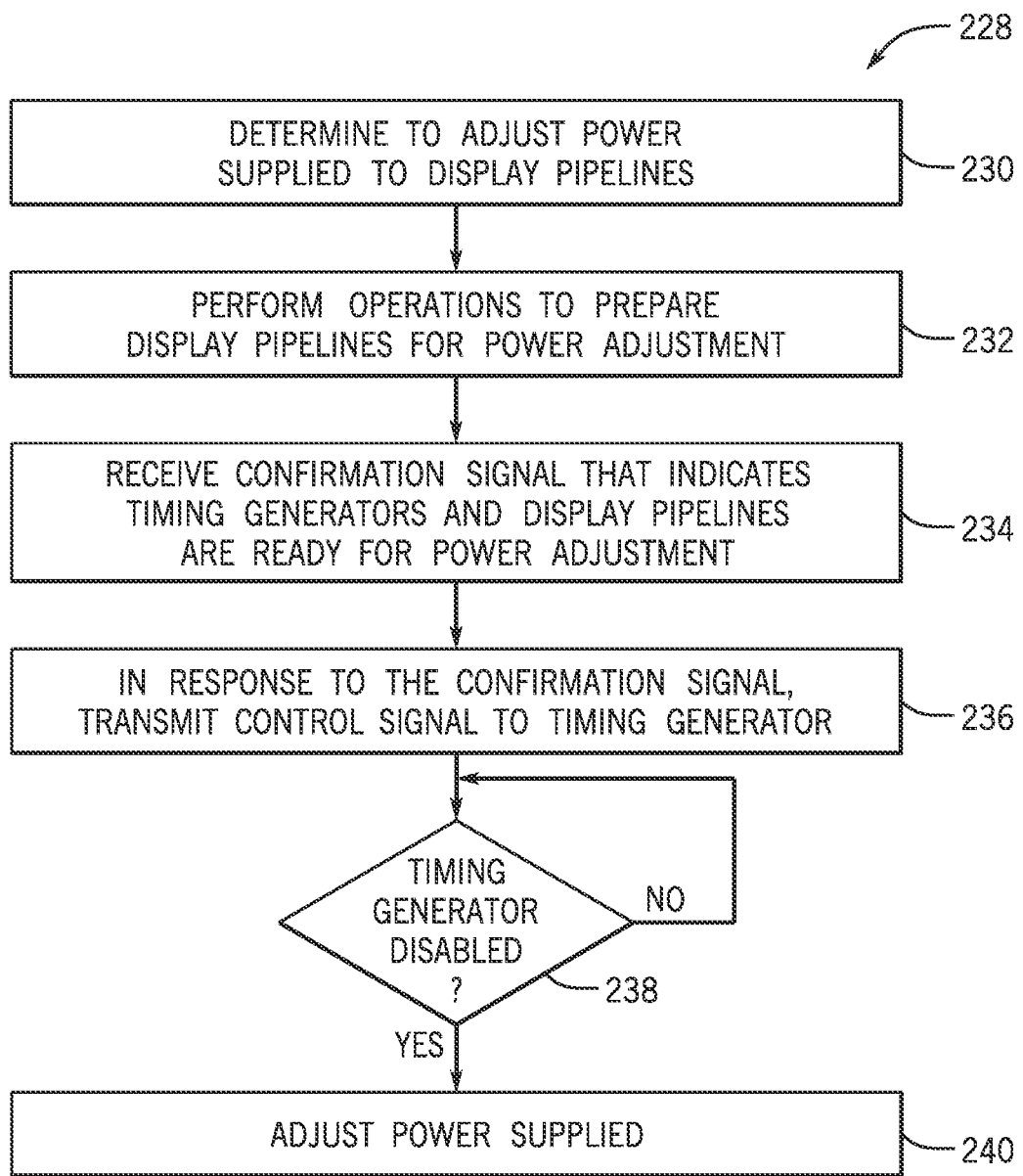
FIG. 13 is a flow diagram of a process for powering off two or more display pipelines of FIG. 7 based on the synchronization operation generally described in FIG. 10, in accordance with an embodiment.

Several example operations are described with FIGS. 11-13. FIG. 11 is a flow diagram of a process 180 for starting up or powering on two or more display pipelines 60. The process 180 may be performed by a controller of the processor core complex 18, such as a display pipeline controller of the display pipeline 60 in response to executing instructions stored in a tangible, non-transitory, computer-readable medium, such as external memory 40 or other memory. For ease of description, the process 180 is described as performed by the system controller 66. However, it should be understood that any suitable processing circuitry disposed internal to the display pipelines 60 or external to the display pipelines 60 may be used. It is noted that the operations of the process 180 are shown in a particular order; however, some of the operations may be performed in a different order than what is presented.

With the foregoing in mind, the system controller 66 may determine (at block 182) a topology of one or more electronic displays 12 coupled to the electronic device 10. The system controller 66 may transmit control signals and determine the topology (e.g., arrangement) from responses from the electronic displays 12 in response to the control signals. In some cases, the system controller 66 may receive metadata from the electronic displays 12 indicating its topology, may receive input signals from I/O ports 16, or the like, and use the metadata or inputs to determine or infer the topology of the electronic displays 12. Furthermore, when there are more than one electronic displays 12, each electronic display 12 may transmit its own metadata. The system controller 66 may discern the topology of the group of electronic displays 12 from the metadata from each electronic display 12. The topology may refer to an arrangement of the electronic displays 12, a number of panels each electronic display 12 has, a number of regions (e.g., whether the panel is tiled or not tiled) of each panel, a pixel-rate or presentation frequency (e.g., a value in Hertz (Hz) used to present image frames on the electronic displays 12), a resolution of each panel or of each region of a respective panel, a line time (e.g., row time) to use when presenting image frames, or the like. Thus, the system controller 66 determining a topology may be identifying data indicative of configurations of the electronic displays 12.

The system controller 66 may program (at block 184) the one or more display pipelines 60 based on the determined topology. To do so, the system controller 66 may retrieve one or more configuration files from memory 20, retrieve one or more configuration files external memory 62, generate control signals, or the like in response to determining topology. The system controller 66 may transmit or configure each display pipeline 60 with one or more of the configuration files, with the control signals, or both. A respective configuration file may be used to program components, processes, or both, of one or more display pipelines 60. A respective control signal may be used to operate switching circuitry into a suitable configuration for the determined topology. When the electronic device 10 includes multiple display pipelines 60 communicatively coupled to one or more electronic displays 12 having multiple panels or panel regions 52, the system controller 66 may transmit one or more control signals to operate multiplexing circuitry 96 and/or switch 98 in a suitable arrangement for the determined topology.

The system controller 66 may similarly program the rate match circuitry 130 and/or the data merge circuitry 132 based on the determined topology. The system controller 66 may program line times to be used by the rate match circuitry 130 and/or the data merge circuitry 132 to program data buffering to be used on one or more image frames to reduce a likelihood of data loss during transmission between components, program pixel-rate based on the determined topology, or the like.

The system controller 66 may connect (at block 186) power to each of the display pipelines 60, power-on each of the display pipelines 60, or the like. After the display pipelines 60 are powered on, the system controller 66 may enable (at block 188) each timing generator 104 of each respective display pipeline 60. The timing generator 104 being enabled triggers a response by the corresponding display pipeline 60 since, for example, the timing generator 104 may be enabled by writing a value to a register monitored by the corresponding display pipeline 60. When a display pipeline 60 detects that the corresponding timing generator 104 is enabled, the display pipeline 60 performs the synchronization operations of FIG. 10. For example, each display pipeline 60, upon the value being written to the register of the timing generator 104, does not start running the timing generator 104 and proceeds to transmit a local status to its paired display pipeline 60 (e.g., display pipeline 60A and display pipeline 60B are paired in FIGS. 8 and 9). The display pipeline 60 then awaits reception, as a remote status, of the local status of the paired display pipelines 60. Once the display pipeline 60 receives the remote status, the display pipeline 60 may write an updated status, which verifies the display pipelines 60 are synchronized and the hardware-based synchronization of FIG. 10 was performed.

The system controller 66 may wait (at block 190) until the display pipeline 60 updates the status after synchronization of the display pipelines 60. When the status is updated, the system controller 66 may transmit (at block 192) a control signal to initiate performance of image data processing and handling operations.

Once powered on, the display pipelines 60 may be used to process image data associated with automated presentation operations (e.g., flip-book operational mode, always-on displays operational mode), operations that use a time stamp queue, or both. These operations may be synchronized between display pipelines 60 using the handshaking operations of FIG. 10, and thus enable the respective display pipelines 60 to make the same control decisions based on exchanged statuses.

To elaborate, FIG. 12 describes an example of a process 204 that uses the handshaking operations of FIG. 10 before changing an operational mode (i.e., operational state). The process 204 may be performed by a controller of the processor core complex 18, such as a display pipeline controller of the display pipeline 60 in response to executing instructions stored in a tangible, non-transitory, computer-readable medium, such as external memory 40 or other memory. For ease of description, the process 204 is described as performed by the system controller 66. However, it should be understood that any suitable processing circuitry disposed internal to the display pipelines 60 or external to the display pipelines 60 may be used. It is noted that the operations of the process 204 are shown in a particular order; however, some of the operations may be performed in a different order than what is presented.

The system controller 66 may determine (at block 206) to change an operational mode of one or more display pipelines 60. A change in operational mode may relate to changing configurations of the display pipelines 60, the display pipelines 60 being operated into a flip-book mode (e.g., automated presentation mode), or the like. A configuration of one or more display pipelines 60 may change in response to changes in ambient temperatures or ambient lighting associated with an environment that the electronic display 12 is used. Furthermore, a configuration of the one or more display pipelines 60 may change in response to a change in image data (e.g., video data) being presented, such as a change in refresh rate, timing expectations, global brightness values of the image data, color spaces used for processing of the image data, and the like.

Elaborating on the flip-book mode, an electronic device 10 may include one or more time stamp queues. A time stamp queue may include a first-in first-out queue that is used to schedule pre-rendered image frames for later presentation at a defined presentation time, such that many image frames may be generated and stored in the external memory 62 for subsequent retrieval by display pipelines 60 without an image source (i.e., application processor 80) necessarily being powered-on to render image data for the image frame. Operating the electronic device 10 in a flip-book mode may help reduce power consumption since the electronic device 10 consumes less power overall when an image source is powered off or provided a reduced amount of power (i.e., power-gated). Although beneficial, changing an operational mode (e.g., changing configurations, operating into a flip-book mode) of the one or more display pipelines 60 may increase a likelihood of desynchronizing operations of the one or more display pipelines 60, and thus using the handshaking operations of FIG. 10 may help reduce a likelihood of the change in operational mode desynchronizing the operations.

In response to determining to change the operational mode, the system controller 66 may determine (at block 208) a configuration packet ready status. The system controller 66 may determine configuration packet ready status based on two statuses from respective display pipelines 60. The configuration packet ready status may indicate when each display pipeline 60 is ready for the change. Referring to FIG. 10 from the perspective of the display pipeline 60A as an example, the configuration packet ready status of the display pipeline 60A may correspond to the local status 148 for the display pipeline 60A and the remote status 164 may correspond to the configuration packet ready status of the display pipeline 60B transmitted to the display pipeline 60A. The display pipeline 60A may report the configuration packet ready status to the system controller 66 in response to the local status 148 and the remote status 164. It is noted that this described handshaking operation of FIG. 10 as applied to the configuration packet ready status may be repeated for any suitable status desired to be synchronized between one or more display pipelines 60 before continuing on with other operations, as described herein with respect to an interrupt of operations of block 210, idle status of block 212, empty statuses of block 214, and the like. The configuration packet ready status may indicate to the system controller 66 whether a shadow first-in, first-out buffer, configuration buffer, queue, or the like of either display pipeline 60 is to be drained (e.g., emptied of queued entries) before changing the operational mode.

After preparing any buffers or queues indicated by the configuration packet ready status at block 208, the system controller 66 may generate (at block 210) an interrupt to trigger the transition between the operational modes or to trigger the update of configurations. The interrupt may be transmitted to control circuitry and/or the display pipelines 60. In response to the interrupt being received by the display pipelines 60, each display pipelines 60 may update a status to the system controller 66 to proceed with the transition after performing handshaking operations according to FIG. 10 operations with the other display pipelines 60 to verify that each had received respective corresponding interrupt signals.

The system controller 66 may determine (at block 212) that each of the display pipelines 60 are idle based on statuses, or idle signals, transmitted from each of the display pipelines 60 (e.g., combination of local and remote statuses). When changing an operational mode of a display pipeline 60 that is paired or synchronized with one or more additional display pipelines 60, the system controller 66 may verify that each display pipeline 60 is not in the middle of processing image data, and thus ready for the operational mode change. Verifying that each display pipeline 60 is ready for an operational mode change may involve the system controller 66 waiting for a status update from a display pipeline 60 transmitted in response to performing handshaking operations according to FIG. 10 operations with the other display pipelines 60 to verify that each are idle. The received status update resulting from the handshaking operation indicates that each display pipeline 60 is idle.

In some cases, the system controller 66 may determine (at block 214), using the handshaking operation of FIG. 10, that each display pipeline 60 do not have any outstanding requests to present new image frames, and thus one or more queues used to manage requests to present new image frames are each empty. The display pipelines 60 may exchange local statuses and update respective statutes reported to the system controller 66 based on both local statuses in response to performing handshaking operations according to FIG. 10 operations with the other display pipelines 60 to verify that each does not have an outstanding presentation request (i.e., each queue is empty). This indication may also be used to determine that the queues are not empty and report that one or more outstanding presentation requests exist.

In response to above-described handshaking operations, the system controller 66 may transmit (at block 216) one or more control signals to change operational modes of the display pipelines 60. The system controller 66 may proceed with the changes since the system controller 66 has verified each synchronized display pipeline 60 is ready and able to change modes.

After being powered on, the system controller 66 may, at some point, determine to power off the display pipelines 60 (e.g., based upon a provided input). FIG. 13 describes an example of a process 228 that uses handshaking operations of FIG. 10 when powering off display pipelines 60, such as when shutting down to reduce power consumption when idle. The process 228 may be performed by a controller of the processor core complex 18, such as a display pipeline controller of the display pipeline 60 in response to executing instructions stored in a tangible, non-transitory, computer-readable medium, such as external memory 40 or other memory. For ease of description, the process 228 is described as performed by the system controller 66. However, it should be understood that any suitable processing circuitry disposed internal to the display pipelines 60 or external to the display pipelines 60 may be used. It is noted that the operations of the process 228 are shown in a particular order; however, some of the operations may be performed in a different order than what is presented.

The system controller 66 may determine (at block 230) to adjust power supplied to the display pipelines 60. The system controller 66 may power off and/or reduce power to one or more of the display pipelines 60 when one or more of the display pipeline 60 are idle, such as the duration of time between finishing processing of first image data and starting processing of second image data, or when the electronic device 10 is being powered off. The system controller 66 may determine to adjust power supplied to the display pipelines 60 in response to a user input, such as at an input device 14, via a touch screen of the electronic display 12, as an audio command received at an input device 14, or in response to an operational decision of the system controller 66 to power off or power gate the display pipelines 60.

In response to determining to adjust power supplied to the display pipelines 60, the system controller 66 may perform (at block 232) operations to prepare the display pipelines 60 for being powered off or for having its power supplied reduced. The operations may include verifying statuses, resetting registers, and the like to verify that the display pipelines 60 are able to be powered off. In some cases, the system controller 66 may transmit a control signal to the timing generators 104 to instruct the timing generators 104 to each prepare to be powered off. The control signal transmitted may include a logical high voltage level that is toggled to a logical low voltage level when the system controller 66 is preparing to adjust power supplied to the display pipelines 60 at block 232. A time of the control signal toggle may be compared to a time of toggle of another status signal respectively generated by each respective timing generator 104 to determine whether or not to delay the power off. Delaying power-off by one or more image frames may permit ongoing processing operations to complete before being stopped for the power-off. For example, the timing generator 104 may verify a status stored in a register responsive to the control signal to determine whether the status stored in the register changed in value before the control signal changed in value. When the status of the register changed before the toggle of the control signal, the timing generator 104 determines that its corresponding display pipeline 60 is ready for the supply power adjustment (i.e., to be powered off) and transmits the confirmation signal without further delay) to the system controller 66. When the status is stored in the register after the control signal is asserted, the timing generator 104 may delay transmission of a confirmation signal until its corresponding display pipeline 60 completes processing of the current image frame. In some cases, the handshaking operations of FIG. 10 may be used to exchange confirmation signals corresponding to respective timing generators 104 with the other display pipelines 60 to verify that each display pipeline 60 and timing generator 104 is synchronized and ready for the power adjustment. In cases where the handshaking operation is used, a confirmation signal transmitted from a respective display pipeline 60 to the system controller 66 is not transmitted until the respective display pipeline 60 has confirmed that each of the other display pipelines 60, with which its operations are synchronized, are ready for the power adjustment.

When the timing generators 104 and display pipelines 60 are ready, the system controller 66 may receive (at block 234) one or more confirmation signals that indicate that the display pipelines 60 are ready for the power adjustment. Once the system controller 66 receives the confirmation signals, the system controller 66 may transmit (at block 236) a control signal to disable the timing generators 104. When disabled, a status indicative of the timing generators 104 being disabled may toggle, indicating to the system controller 66 when the timing generators 104 are disabled. The system controller 66 may monitor (at block 238) for when the status is returned to determine when the timing generators 104 are disabled. The status may be returned in response to each of the timing generators 104 being disabled or powered off in response to each display pipeline 60 monitoring and exchanging status signals via handshaking operations before transmitting a status to the system controller 66. In some cases, when the system controller 66 does not receive the status within a current image frame, the system controller 66 may instruct a repeat presentation of a same image frame to allocate additional time to receive the status signals from one or more of the display pipelines 60 and/or timing generators 104. In response to receiving the status signal indicative of each timing generator 104 being disabled or powered off, the system controller 66 may adjust (at block 240) an amount of power supplied to the display pipelines 60, such as to reduce the power to zero or power off the display pipelines 60, to reduce the power to power-gate the display pipelines 60, or a combination of power-gating and powering-off of the display pipelines 60.

Figure 14:
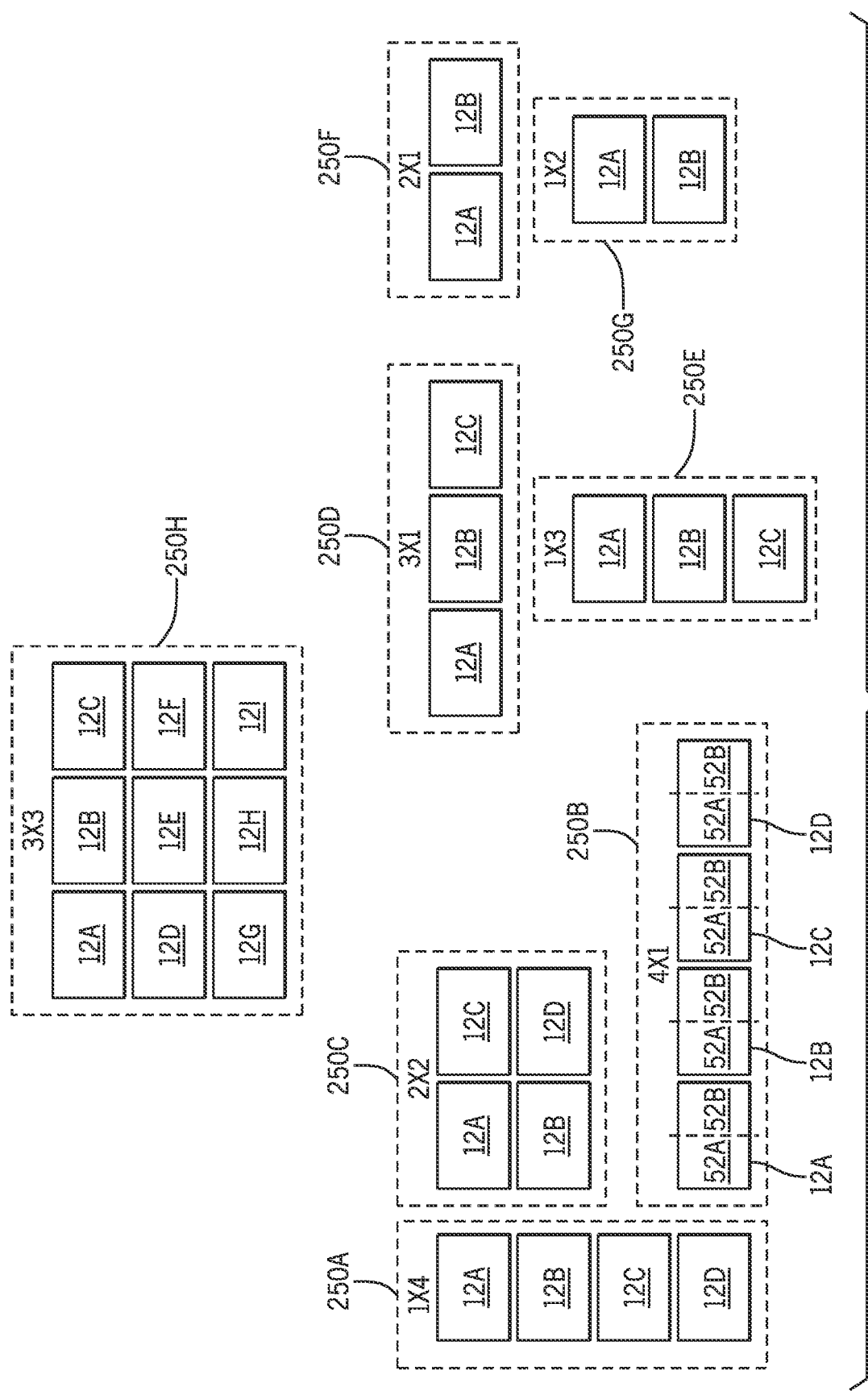
FIG. 14 is a diagrammatic representation of example arrangements of electronic displays of FIG. 1 that may be used with the systems and methods for hardware-based synchronization operations described herein, in accordance with an embodiment.

Keeping the foregoing in mind, these systems and methods may be applied to any suitable number of electronic displays 12 and display pipelines 60. For example, FIG. 14 is a diagrammatic representation of several suitable arrangements 250 (e.g., 250A, 250B, 250C, 250D, 250E, 250F, 250G, 250H) of electronic displays 12. Indeed, in arrangement 250A, 4 displays 12A-D may be driven by respective display pipelines 60 and vertically arranged. However, any number of displays may be arranged, such as in arrangement 250G where 9 displays 12A-I are used to provide a 3×3 display topology. However, the same displays may be horizontally arranged and each driven by two display pipelines 60 (e.g., to produce data for regions 52A and 52B, respectively), as shown in arrangement 250B. These 4 displays 12 are not restricted to just horizontal and vertical arrangements, and may be arranged in any geometric arrangement, such as the case in the arrangement 250C. Additional or fewer electronic displays 12 may be used, as shown in arrangements 250D-H. Also, any of these arrangements may use a display pipeline 60 for a respective electronic display 12 that processes image data in parallel with itself to achieve relatively higher data throughput.

Different electronic displays 12 may have different abilities to be combined into display groups. A display group of electronic displays may present, in a coordinated manner, an image frame than spans multiple of the electronic displays 12 or multiple panels 50. The system controller 66 may receive one or more parameters from one or more electronic displays 12 that indicate configuration capabilities of the respective electronic displays 12. Indeed, each electronic display 12 may transmit its own parameter, one electronic display 12 may transmit a parameter indicating a configuration for multiple electronic displays 12, one or more electronic displays 12 may transmit one or more parameters, where one or more of the one or more parameters may indicate configurations for one or more of the electronic displays 12, or any other suitable combination may be used to provide the electronic device 10 with a parameter.

A parameter may include or indicate data that communicates a configuration of at least a portion of an electronic display 12 to the system controller 66 and may include any suitable configuration information. For example, the parameters may indicate a number of regions 52 corresponding to the electronic display 12 or a range of a number of sub-panels corresponding to the electronic display 12. In other words, the parameter may provide an indication of a number of sub-panels that the system controller 66 may control display pipelines 60 to produce corresponding image data. The parameters may indicate a color scheme and/or a color space of one or more portions of the electronic display 12. In this way, the system controller 66 may determine based on the parameter to instruct the display pipeline 60 to process the image data accordingly in a manner compatible with the color space or presentation color. Furthermore, the parameters may include a refresh rate of one or more portions of the electronic display 12, which the system controller 66 may reference when determining timing to use to drive the electronic displays 12 and/or when instructing the display pipelines 60 to process image data. The parameter may additionally or alternatively indicate an arrangement of the electronic display 12 relative to other electronic displays 12.

In some cases, the system controller 66 may use the indication of the arrangement to determine how to allocate image data for processing by the respective display pipelines 60. To do so, the system controller 66 may consider which display pipeline 60 is closer to (e.g., shortest wire length to) which I/O port 16 (or another component) of which electronic display 12, and thus the system controller 66 may consider proximity. Indeed, the system controller 66 may determine or receive an indication of a logical proximity, a physical proximity, or both, which quantifies a logical distance or a physical distance between a respective display pipeline 60 and a respective electronic display 12 (or portion of an electronic display 12) that image data generated by the respective display pipeline 60 is to be transmitted. The proximity may be determined based on test signals being analyzed, from a look-up table or data repository correlating a proximity value to the arrangement, or the like. For example, the proximity may be determined based on a logical distance, a physical distance, or a wire length between an input to the electronic display 12 and another component used as a reference for a location of a respective display pipeline 60, such as the multiplexer circuitry 96.

An electronic device 10 may include systems of display pipelines 60 and synchronization circuitry (e.g., switching circuitry 260 of FIG. 15 and timing generators 104) to support a variable number of electronic display 12 and display panel 50 configurations and arrangements. An example of these systems is illustrated in FIG. 15.

Figure 15:
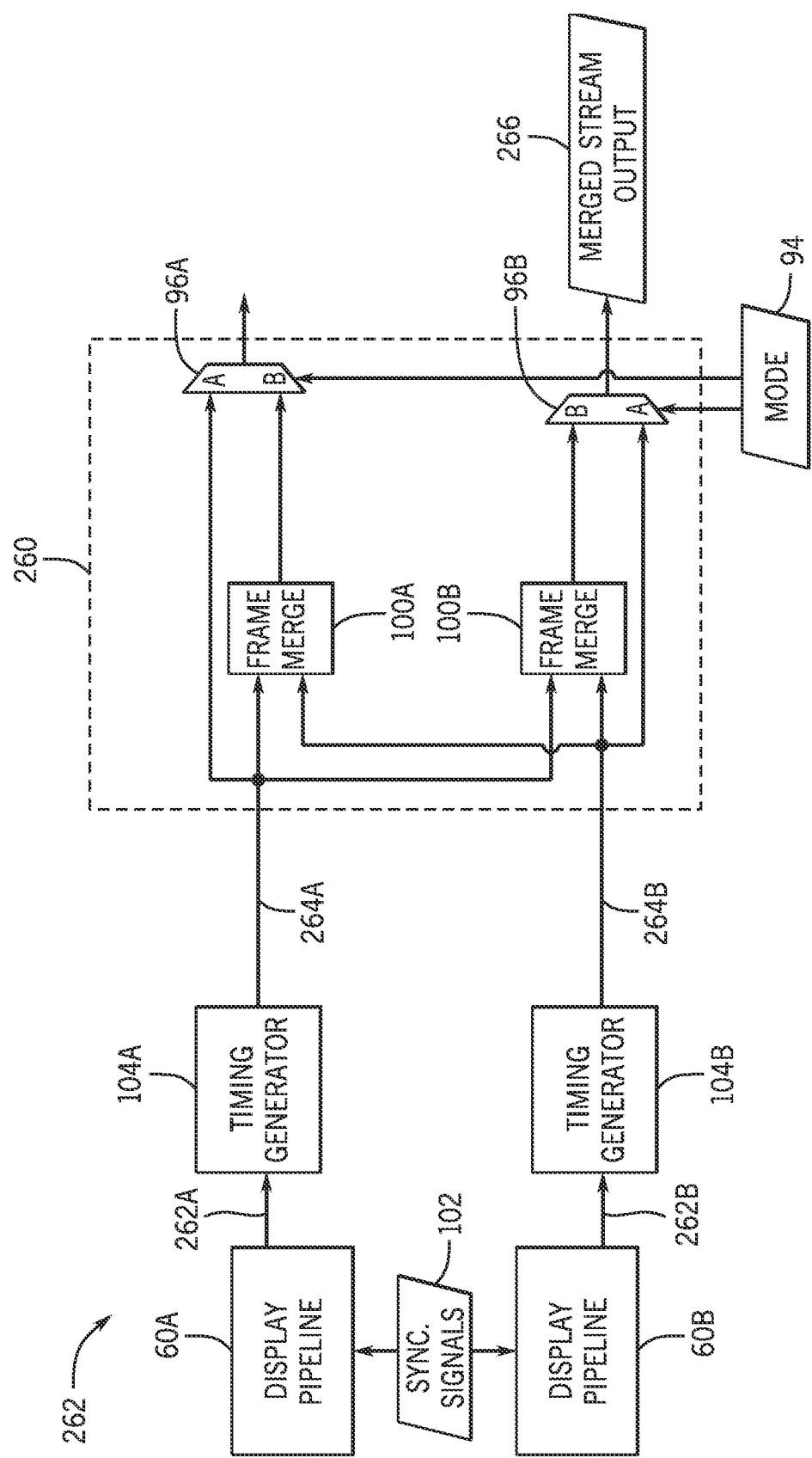
FIG. 15 is a block diagram of display pipelines of FIG. 7 including switching circuitry and other components that enable the display pipelines to process image data for presentation according to methods compatible with a variety of display arrangements and configurations, in accordance with an embodiment.

FIG. 15 is a block diagram of display pipelines 60 and switching circuitry 260 that enables the display pipelines 60 to process image data for presentation compatible with a variety of display arrangements and configurations. It should be understood that additional or alternative circuitry may be included as or between each of the depicted circuitry. This example arrangement shows merging of display pipelines 60 outputs transmitted via path 262 into one output (e.g., merged stream output 266).

To elaborate, the display pipelines 60 may process image data in parallel with each other. The image data may be image data for a same image frame, for different regions 52 of a same image frame, or the like. When processing the image data, the display pipelines may exchange synchronization signals 102 with each other, some of which may be the handshaking described at least in FIG. 10. Processed image data is output via path 262A and path 262B to respective timing generators 104. Outputs generated by the timing generator 104A are transmitted via path 264A to the multiplexer 96A, the frame merge circuitry 100A and the frame merge circuitry 100B. Outputs generated by the timing generator 104B are transmitted via path 264B to the multiplexer 96B, the frame merge circuitry 100A, and the frame merge circuitry 100B.

The system controller 66 may use outputs from the display pipelines 60 to present an image on a whole display panel 50, as opposed to separate regions 52. When doing so, the system controller 66 operates the switching circuitry 260 to merge the output from the display pipeline 60A with the output from the display pipeline 60B at either the frame merge circuitry 100B or the frame merge circuitry 100A.

The system controller 66 may instruct the frame merge circuitry 100B or the frame merge circuitry 100A to perform merging operations and may transmit the mode signal 94 to operate the multiplexing circuitry 96 in a merging mode (e.g., "B" state) as opposed to a dual mode (e.g., "A" state) that generates dual streams of image data. Image data output from one of the respective frame merge circuitry 100 may have a pixel rate of the merged image data output 266 that is twice (e.g., 2×) a pixel rate of each individual data stream received at the frame merge circuitry 100. When additional data streams than two are merged, such as three data streams, that pixel rate may increase to 3× greater or more based on the number of additional data streams.

Since either the frame merge circuitry 100A or the frame merge circuitry 100B may be used to merge the outputs to generate the merged stream output 266, the system controller 66 may determine between the two frame merge circuitry 100. The system controller 66 may select between the frame merge circuitry 100A or the frame merge circuitry 100B based on the physical arrangement of the display pipelines 60 relative to an I/O port 16 of a corresponding electronic display 12. For example, the output from the multiplexer 96B, may be disposed closer to an I/O port 16 for an electronic display 12 than the output from the multiplexer 96A. "Closer" may be related to logical proximity, physical proximity, or resource consumption proximity (e.g., preferentially using a respective frame merge circuitry 100 since less resources are consumed when transporting the resulting merged stream output 266 to the corresponding electronic display 12). Less time and resources may be used when outputs from the display pipelines 60 are merged using the frame merge circuitry 100 disposed relatively closer to the corresponding I/O port 16 for the corresponding electronic display 12. Thus, the system controller 66 may determine the relative nearness of each display pipeline 60 to determine how to assign mode signals 94 to guide outputs from the display pipelines 60. These determinations also apply to systems that have more than two display pipeline 60 outputs merging into one output at a frame merge circuitry 100 selected from more than two frame merge circuitry 100.

Figure 16:
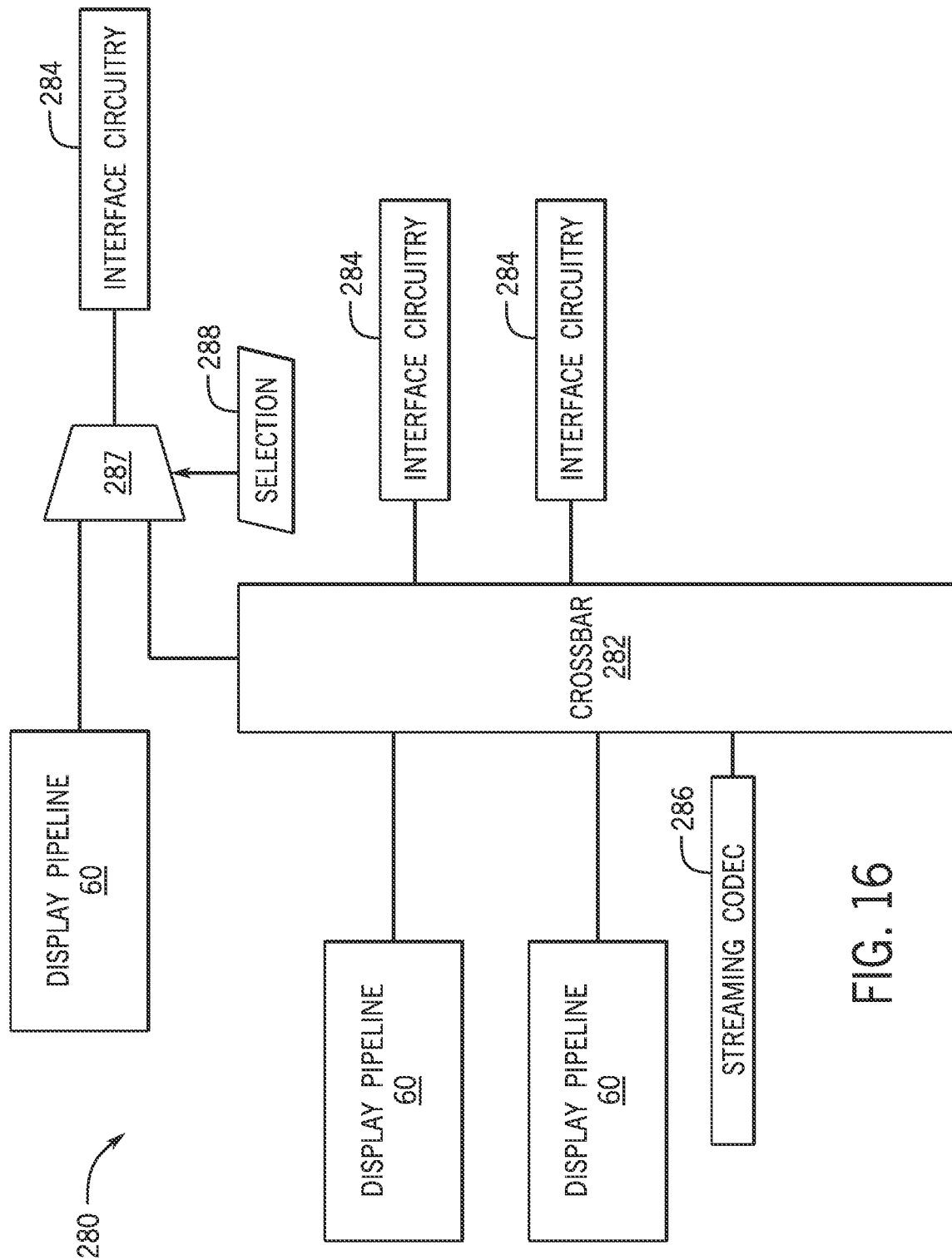
FIG. 16 is a block diagram of a crossbar that is able to be coupled between display pipelines and interface circuitries, in accordance with an embodiment.

These determinations may additionally or alternatively be used to determine which display pipelines 60 to assign to which display interface circuitry when each are coupled to a crossbar. FIG. 16 is a block diagram that illustrates a routing system 280 that includes a crossbar 282. The crossbar 282 may route signals to and from different portions of the electronic device 10, such as between the display pipelines 60 and interface circuitry 284, between a streaming encoding device (codec) 286, and the interface circuitry 284, between the streaming codec 286 and the display pipelines 60, or the like. The streaming codec 286 may receive or transmit video stream image data, and thus help with encoding or decoding of the data. Thus, the crossbar 282 may receive and transmit signals for distribution between components coupled or selectively coupled to the crossbar 282.

The crossbar 282 may support full connectivity between any of the display pipelines 60 and any input/output port of the interface circuitry 284, including facilitating performance of or performing the frame merging operations of the frame merge circuitry 100. Thus, the crossbar 282 may route image data output from one display pipeline 60 to another display pipeline 60 to be merged, in accordance with operations described here using the frame merge circuitry 100. Each of the interface circuitries 284 may include circuitry like the network interface 24, I/O ports 16, or the like. In some cases, control circuitry of the electronic device 10 (e.g., processor core complex 18) may generate and transmit to a selection circuitry 287 (e.g., a multiplexer) a selection signal 288 to operate the crossbar 282 to transmit a signal via the selection circuitry 287. The selection circuitry 287 may alternatively transmit data from an upstream display pipeline 60 and any associated processing circuitry.

Routing between circuitry described herein may be routed via the crossbar 282 circuitry, which may improve resource consumption and a footprint of subsystems of the electronic device 10 by permitting more efficient routing and component placement. Furthermore, display pipelines 60 may be assigned to interface circuitries 284 based on relative proximity between the components to reduce a time in flight for data transmitted between the components. The interface circuitries 284 may couple to Universal Serial Bus (USB) ports (e.g., USB port type C (USB-C), High-definition Multimedia Interface (HDMI) ports, Ethernet ports, or suitable any type of input or output port to drive image data generated by the display pipelines 60 out to the electronic display 12. These interfaces may use a bus of any data width and/or may include data conversion circuitry inline to prepare data for transmission to the electronic display 12 via wired or wireless transmission link.

In some cases, the image data processed by one or more display pipelines 60 may correspond to image data to be presented via different regions 52 of various display panels 50, and thus may correspond to multiple image frames displayed at a same time as if a single image frame (e.g., video sequences overlaid on other image data). For example, fewer processing resources may be consumed when the system controller 66 instructs a display pipeline 60A to process an image frame that is part of video data presenting a static image over time and instructs a display pipeline 60B to process image data to be overlaid on the image frame of the static image.

As described herein, the system controller 66 is disposed outside of display pipeline 60 circuitry. It is noted that in some cases, a shim controller may perform some or all of the operations that the system controller 66 is described as performing. Indeed, a shim controller may be disposed or operate in an operational or software layer higher or different than that used for the display pipeline 60. The shim controller may be a software application that may intercept calls that request an operation to be performed and may edit these operation requests, handle the operation requests itself, or redirect the operation requests elsewhere, such as to one or more display pipelines 60.

In some cases, the display pipelines 60 may use timing from an external timing source as opposed to the timing generators 104. The external timing source may implicitly adjust the video timing based on a control signal transmitted to each of the display pipelines 60. The control signal may be a signal transmitted, or may be a value stored in a register read by each display pipeline 60. One use of the external timing sources may be to adapt a display pipelines 60 video timing to reduce drift between two computing devices running clocks derived from different timing crystals and/or timing control devices. When using the external timing source, each display pipeline 60 may use an idle mode, which, while in, the display pipeline 60 awaits a "GO" signal to begin its operations.

It is noted that the display pipelines 60 may be configurable into a dual-pipe or multi-pipe operational mode and into a single pipe operational mode. When in a single pipe operational mode, one display pipeline 60 may be elected by the system controller 66 for use in generating image data for presentation. To change modes, the system controller 66 may transmit a control signal to initiate the change from the single pipe operational mode to a dual pipe or multi-pipe operational mode. The control signal may be transmitted after the system controller 66 verifies that each display pipeline 60 is idle and ready for the mode change.

Thus, the technical effects of the present disclosure include systems and methods that improve image processing operations by enabling parallel processing of image data via a variable number of display pipelines for presentation via a variable number of displays. By including timing generator circuitry and by using synchronizing operations, multiple display pipelines may be used to generate image data for a single image frame, for portions of a single image frame, for adjacently presented image frames, or the like. Synchronizing operations may increase a likelihood of operations performed by each display pipeline being synchronized relative to each other. Thus, by using the synchronization operations, the resulting image data generated by the synchronized display pipelines may have no or a reduced amount of delay when presented.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
    an electronic display comprising a plurality of display pixels configured to present an image based at least in part on image data; and
    a first display pipeline configured to process first image data, wherein a first subset of the plurality of display pixels receive the processed first image data;
    a second display pipeline communicatively coupled to the first display pipeline and configured to process second image data, wherein a second subset of the plurality of display pixels receive the processed second image data, and wherein the second display pipeline is configured to process the second image data based at least in part on a first status signal received from the first display pipeline after transmitting a second status signal to the first display pipeline at least in part by:
        performing a first image processing operation on the second image data;
        after performing the first image processing operation, latching the second status signal;
        in response to latching the second status signal, transmitting, via the second display pipeline, the second status signal to the first display pipeline;
        receiving the first status signal from the first display pipeline;
        in response to receiving the first status signal, latching the first status signal; and
        determining to perform a second image processing operation on the second image data based at least in part on the first status signal and the second status signal;
    selectively enabled frame merge circuitry configured to receive the processed first image data from the first display pipeline and the processed second image data from the second display pipeline and configured, when enabled, to merge the processed first image data and the processed second image data to generate a merged video stream; and
    a control system configured to enable the frame merge circuitry in response to determining to transmit the merged video stream to the electronic display.

2. The electronic device of claim 1, wherein the plurality of display pixels is divided into a first panel region and a second panel region, wherein the first panel region comprises the first subset of the plurality of display pixels, and wherein the second panel region comprises the second subset of the plurality of display pixels.

3. The electronic device of claim 2, wherein, while controlling when the processed first image data and the processed second image data are transmitted as the merged video stream, the control system is configured to:
    determine to transmit the processed first image data to the first panel region and to transmit the processed second image data to the second panel region as separate video streams, wherein the first subset of the plurality of display pixels has a different number of pixels relative to the second subset of the plurality of display pixels; and
    in response to determining to transmit the processed first image data and the processed second image data as the separate video streams:
        transmit a first control signal to disable the frame merge circuitry; and
        transmit a second control signal to switching circuitry to operate the switching circuitry to bypass the frame merge circuitry.

4. The electronic device of claim 1, wherein, while controlling when the processed first image data and the processed second image data are transmitted as the merged video stream, the control system is configured to:
    determine to transmit the processed first image data and the processed second image data to the electronic display as the merged video stream; and
    in response to determining to transmit the processed first image data and the processed second image data the merged video stream:
        transmit a first control signal to enable the frame merge circuitry; and
        transmit a second control signal to switching circuitry to operate the switching circuitry to transmit the processed first image data and the processed second image data as the merged video stream from the frame merge circuitry.

5. The electronic device of claim 1, wherein, while controlling when the processed first image data and the processed second image data are transmitted as the merged video stream, the control system is configured to:
    receive a parameter from the electronic display, wherein the parameter indicates a configuration of the electronic display; and
    determine to transmit the processed first image data and the processed second image data as separate video streams or as the merged video stream based at least in part on the parameter.

6. The electronic device of claim 1, wherein the control system is configured to:
    instruct the frame merge circuitry to generate the merged video stream at least in part by combining the processed first image data and the processed second image data; and
    transmit a control signal to operate switching circuitry to transmit the merged video stream to the electronic display.

7. The electronic device of claim 1, wherein the frame merge circuitry is configured to perform a rate match operation, a video line merge operation, or a display stream compression merge operation, or any combination thereof when combining the processed first image data and the processed second image data to generate the merged video stream.

8. The electronic device of claim 1, wherein the first display pipeline comprises a first flip-flop and a second flip-flop, wherein the second display pipeline comprises a third flip-flop and a fourth flip-flop, wherein the first flip-flop is configured to latch the first status signal, wherein the third flip-flop is configured to latch the second status signal after the first flip-flop latches the first status signal, wherein the second flip-flop is configured to latch the second status signal, wherein the fourth flip-flop is configured to latch the first status signal after the second flip-flop latches the second status signal, wherein the second display pipeline is configured to process the second image data based at least in part on the first status signal and the second status signal after the first status signal is latched, and wherein the first display pipeline is configured to process the first image data based at least in part on the first status signal and the second status signal after the second status signal is latched.

9. The electronic device of claim 1, wherein the electronic device comprises additional frame merge circuitry and a system controller, and wherein the system controller is configured to:
   determine a distance between an input to the electronic display and a first multiplexer; and
   determine which of the frame merge circuitry and the additional frame merge circuitry to instruct to generate the merged video stream based at least in part on the distance.

10. A method of operating a control system, comprising:
   determining to adjust an operational mode of a first display pipeline and an operational mode of a second display pipeline;
   receiving a first status signal from the first display pipeline indicative of a current state of the first display pipeline, wherein the first status signal is generated based at least in part on a current state of the second display pipeline and the current state of the first display pipeline exchanged as part of a handshaking operation performed by the first display pipeline and the second display pipeline;
   receiving a second status signal from the second display pipeline indicative of the current state of the second display pipeline, wherein the second status signal is generated based at least in part on the current state of the first display pipeline and the current state of the second display pipeline as part of the handshaking operation;
   determining that the first status signal and the second status signal indicate readiness of the first display pipeline and the second display pipeline for the adjustment; and
   in response to the first status signal and the second status signal indicating readiness for the adjustment, transmitting a control signal to adjust the operational mode of the first display pipeline and the operational mode of the second display pipeline at a synchronized time.

11. The method of claim 10, wherein transmitting the control signal is also done so in response to a first idle signal received from the first display pipeline and a second idle signal received from the second display pipeline, and wherein the first idle signal and the second idle signal indicate that the first display pipeline and the second display pipeline are idle.

12. The method of claim 10, wherein determining to adjust the operational mode of the first display pipeline and the operational mode of the second display pipeline comprises:
   receiving a parameter from an electronic display, wherein the parameter indicates a configuration of the electronic display; and
   determining to adjust the operational mode of the first display pipeline and the operational mode of the second display pipeline based at least in part on the configuration indicated by the parameter.

13. The method of claim 12, comprising:
   determining that the parameter indicates, as the display configuration, a single panel electronic display; and
   in response to determining the configuration, determining to adjust the operational mode of the first display pipeline and the operational mode of the second display pipeline to generate a merged video stream.

14. The method of claim 12, comprising:
   determining that the parameter indicates, as the configuration, that the electronic display is one of a plurality of electronic displays that together present an image frame; and
   in response to determining the configuration, determining to adjust the operational mode of the first display pipeline and the operational mode of the second display pipeline to cause each to generate independent video streams of the image frame for output to respective of the plurality of electronic displays.

15. The method of claim 10, wherein the handshaking operation comprises:
   latching, via the second display pipeline, the current state of the second display pipeline;
   latching, via the second display pipeline, the current state of the first display pipeline; and
   transmitting, via the second display pipeline, the second status signal in response to both the latching the current state of the second display pipeline and the latching the current state of the first display pipeline.

16. An electronic device, comprising:
   a first display pipeline configured to transmit first image data via a first output path;
   a second display pipeline configured to transmit second image data via a second output path;
   first frame merge circuitry coupled to the first output path and the second output path, wherein the first frame merge circuitry is configured to generate a merged output stream based at least in part on the first image data and the second image data; and
   second frame merge circuitry;
   a first multiplexer coupled to the first frame merge circuitry, the second frame merge circuitry, and to a third output path, wherein:
      the first multiplexer transmits the merged output stream from the third output path to an electronic display; and
      in response to a first control signal associated with the first frame merge circuitry generating the merged output stream based at least in part on the first image data and the second image data, the first multiplexer transmits the merged output stream to the electronic display; and
   a system controller configured to:
      determine a distance between an input to the electronic display and the first multiplexer; and
      determine which of the first frame merge circuitry and the second frame merge circuitry to instruct to generate the merged output stream based at least in part on the distance.

17. The electronic device of claim 16, wherein the first frame merge circuitry is configured to merge the first image data and the second image data when generating the merged output stream.

18. The electronic device of claim 17, wherein the first frame merge circuitry comprises data merge circuitry configured to:
   divide the first image data into a plurality of slices; and
   encode each of the plurality of slices to generate the merged output stream.

19. The electronic device of claim 17, wherein the second display pipeline processes the second image data based at least in part on a status signal received from the first display pipeline.

20. The electronic device of claim 16, wherein the first display pipeline processes the first image data based at least in part on a configuration that indicates whether the electronic display is configured as a single display, a multi-panel electronic display, or one of a plurality of displays.

* * * * *